United States Patent
Geng et al.

(10) Patent No.: US 12,523,746 B2
(45) Date of Patent: Jan. 13, 2026

(54) METHOD AND APPARATUS FOR SCATTERER LOCALIZATION AND MATERIAL IDENTIFICATION

(71) Applicant: Telefonaktiebolaget LM Ericsson (publ), Stockholm (SE)

(72) Inventors: Yi Geng, Nanjing Jiangsu (CN); Vijaya Yajnanarayana, Bangalore (IN); Deep Shrestha, Linköping (SE); Ali Behravan, Stockholm (SE); Erik Dahlman, Stockholm (SE)

(73) Assignee: Valea AB, Stockholm (SE)

( * ) Notice: Subject to any disclaimer, the term of this patent is extended or adjusted under 35 U.S.C. 154(b) by 318 days.

(21) Appl. No.: 18/265,911

(22) PCT Filed: Dec. 7, 2021

(86) PCT No.: PCT/SE2021/051214
§ 371 (c)(1),
(2) Date: Jun. 7, 2023

(87) PCT Pub. No.: WO2022/124968
PCT Pub. Date: Jun. 16, 2022

(65) Prior Publication Data
US 2024/0036166 A1 Feb. 1, 2024

(51) Int. Cl.
*G01S 7/41* (2006.01)
*G01S 13/00* (2006.01)
*G01S 13/42* (2006.01)

(52) U.S. Cl.
CPC ............. *G01S 7/411* (2013.01); *G01S 13/003* (2013.01); *G01S 13/42* (2013.01)

(58) Field of Classification Search
CPC ......... G01S 7/411; G01S 13/003; G01S 13/04
(Continued)

(56) References Cited

U.S. PATENT DOCUMENTS 5,434,411 A * 7/1995 Miyahara ............. G01N 21/552
250/341.1
5,689,265 A * 11/1997 Otto ...................... G01F 23/284
340/617
(Continued)

FOREIGN PATENT DOCUMENTS

CN 109581317 A 4/2019
CN 109975799 A 7/2019
(Continued)

OTHER PUBLICATIONS

EPO Communication with Supplementary European Search Report dated Oct. 8, 2024 for Patent Application No. 21903960.9, consisting of 9 pages.
(Continued)

*Primary Examiner* — Nuzhat Pervin
(74) *Attorney, Agent, or Firm* — Weisberg I.P. Law, P.A.

(57) ABSTRACT

Embodiments of the present disclosure provide methods and apparatus for scatterer localization and material identification. The method performed by an identification apparatus may comprise: determining (S101) a reflection loss of a power of a wireless signal caused by a reflection at an object, for the purpose of identifying a material of the object and localizing a position of the object. The method performed by a reception apparatus may comprise: receiving (S201) a wireless signal transmitted from a transmission apparatus and reflected by an object; and transmitting (S202), to an identification apparatus, information about the wireless signal. The method performed by a transmission apparatus may comprise: receiving (S301) an indication for identifying a material of an object; and transmitting (S302) a wireless signal reflected by the object to a reception apparatus.

9 Claims, 28 Drawing Sheets

(58) Field of Classification Search
USPC .......................................................... 342/146
See application file for complete search history.

(56) References Cited

U.S. PATENT DOCUMENTS

| | | | | |
|---|---|---|---|---|
| 8,106,812 | B2* | 1/2012 | Andersson | G01S 13/003 |
| | | | | 342/28 |
| 8,376,230 | B2* | 2/2013 | Rock | F27B 17/0016 |
| | | | | 235/439 |
| 8,477,063 | B2* | 7/2013 | Meyers | G01S 13/34 |
| | | | | 342/158 |
| 8,542,106 | B2* | 9/2013 | Hilsebecher | G01S 13/931 |
| | | | | 340/436 |
| 9,164,031 | B2* | 10/2015 | Itsuji | G01N 21/47 |
| 9,838,845 | B2* | 12/2017 | Xiao | H04W 4/025 |
| 9,933,507 | B2* | 4/2018 | Afzal | G01S 11/06 |
| 10,436,889 | B2* | 10/2019 | Giere | F15B 15/2869 |
| 10,698,102 | B2* | 6/2020 | Park | G01S 13/88 |
| 11,009,582 | B2* | 5/2021 | Hu | G01S 5/06 |
| 11,412,400 | B2* | 8/2022 | Ratasuk | G01S 5/02526 |
| 11,716,593 | B2* | 8/2023 | Huang | H04W 88/085 |
| | | | | 455/456.1 |
| 12,248,060 | B2* | 3/2025 | Yang | G01S 13/862 |
| 2004/0246169 | A1 | 12/2004 | Nakano et al. | |
| 2007/0046433 | A1* | 3/2007 | Mukherjee | G06K 7/0008 |
| | | | | 340/572.1 |
| 2007/0109177 | A1* | 5/2007 | Baath | G01S 13/88 |
| | | | | 342/25 C |
| 2007/0139256 | A1* | 6/2007 | Edvardsson | G01S 7/4004 |
| | | | | 342/124 |
| 2011/0181459 | A1* | 7/2011 | Feger | G01S 3/465 |
| | | | | 342/146 |
| 2014/0253361 | A1* | 9/2014 | Rezk | H04K 3/226 |
| | | | | 342/16 |
| 2014/0292096 | A1* | 10/2014 | Yamada | H02J 50/10 |
| | | | | 307/104 |
| 2016/0290779 | A1* | 10/2016 | Tucker | H04B 17/15 |
| 2018/0020362 | A1* | 1/2018 | Kawasaki | H04W 74/0816 |
| 2018/0138996 | A1 | 5/2018 | Lee et al. | |
| 2018/0349727 | A1* | 12/2018 | Moshfeghi | G06T 7/73 |
| 2019/0244242 | A1* | 8/2019 | Takahashi | H04W 8/005 |
| 2020/0025911 | A1* | 1/2020 | Rappaport | H01Q 3/26 |
| 2020/0400780 | A1* | 12/2020 | Talai | G01S 7/414 |
| 2021/0096233 | A1* | 4/2021 | Jadidian | G01S 7/2806 |
| 2021/0336658 | A1* | 10/2021 | Shimon | H04B 7/0413 |
| 2022/0018948 | A1* | 1/2022 | Megerdichian | G01S 7/411 |
| 2024/0426973 | A1* | 12/2024 | Kamo | G01S 7/03 |

FOREIGN PATENT DOCUMENTS

| | | | | |
|---|---|---|---|---|
| EP | 0664619 | A1 * | 7/1995 | ........... H04B 17/309 |
| EP | 3275254 | B1 * | 2/2019 | ............... G01S 5/14 |
| EP | 3986018 | A1 * | 4/2022 | ............. G01S 7/006 |
| WO | WO-2014120289 | A1 * | 8/2014 | ............. G01S 7/412 |
| WO | WO-2016178786 | A1 * | 11/2016 | ............. H01Q 1/245 |
| WO | WO-2017092266 | A1 * | 6/2017 | ............... G01V 3/12 |
| WO | WO-2021216745 | A1 * | 10/2021 | ......... H04W 12/122 |

OTHER PUBLICATIONS

Virk, U.T. et al.; On-Site Permittivity Estimation at 60 GHz Through Reflecting Surface Identification in the Point Cloud; IEEE Transactions on Antennas and Propagation, vol. 66, No. 7; Jul. 2018, consisting of 11 pages.
"Effects of building materials and structures on radiowave propagation above about 100 MHz", ITU-R, Radiocommunication Sector of ITU, Recommendation ITU-R, p. 2040-1, Jul. 2015, 32 pages.
Guidi, Francesco , "Personal Mobile Radars with Millimeter-Wave Massive Arrays for Indoor Mapping", IEEE Transactions on Mobile Computing, vol. 15, No. 6, Jun. 2016, 14 pages.
Han, Kaifeng , et al., "Hidden Vehicle Sensing via Asynchronous V2V Transmission: A Multi-Path-Geometry Approach", IEEE Access, vol. 7, 2019, 18 pages.
Raharjo, Hermawan , et al., "Non-Line-Of-Sight Localization Scheme Using Two-Steps Weighting Process", ICICS, 2009, 5 pages.
Rappaport, Theodore S, et al., "Wireless Communications and Applications Above 100 GHz: Opportunities and Challenges for 6G and Beyond", IEEE Access, 2019, 29 pages.
Seow, Chee Kiat, et al., "Non-Line-of-Sight Localization in Multipath Environments", IEEE Transactions on Mobile Computing, vol. 7, No. 5, May 2008, 14 pages.
Tai, Jason Chang Sheng Tai, et al., "Three-Dimensional Non-Line-of-Sight Localisation in an Indoor Multipath Environment", ICICS, 2009, 5 pages.
Wang, Zhonghai , et al., "Omnidirectional Mobile NLOS Identification and Localization via Multiple Cooperative Nodes", IEEE Transactions on Mobile Computing, vol. 11, No. 12, Dec. 2012, 13 pages.
Wei, Xinning , et al., "AOD/AOA/TOA-based 3D Positioning in NLOS Multipath Environments", 2011 IEEE 22nd International Symposium on Personal, Indoor and Mobile Radio Communications, 2011, 5 pages.
Zhang, Victoria Ying, et al., "Combined AOA and TOA NLOS Localization With Nonlinear Programming in Severe Multipath Environments", IEEE, 2009, 6 pages.

* cited by examiner (a) Step 1 - NLOS single-bounce reflection (b) Step 1 - NLOS double-bounce reflection (c) Step 2 - LOS propagation (a) RL of single-bounce reflection induced by wood, plasterboard, and glass at 100 GHz (b) ΣRL of double-bounce reflection induced by different sequences-of-material at any incident angles $\theta_{i1}$, $\theta_{i2}$ at 100 GHz (a) Intersection of RL data surfaces with plane z=25.66

(b) xy-traces by letting z=25.66

METHOD AND APPARATUS FOR SCATTERER LOCALIZATION AND MATERIAL IDENTIFICATION

TECHNICAL FIELD

The present disclosure relates generally to the technology of wireless technology, and in particular, to a method and an apparatus for scatterer localization and material identification.

BACKGROUND

This section introduces aspects that may facilitate better understanding of the present disclosure. Accordingly, the statements of this section are to be read in this light and are not to be understood as admissions about what is in the prior art or what is not in the prior art.

Perceiving and recognizing material properties, and locations of surfaces and objects is a fundamental aspect of new and emerging use cases, such as robotic perception, virtual reality (VR) applications, digital twins and creating a 3D (three dimensional) digital map of an environment. By combining the scatterers' location information with their material information of an environment, a 3D digital map with another layer of material information can be generated. VR system can use material and location information to generate realistic sensations for a user's physical feeling and enable interaction in a virtual environment.

Some existing localization technologies (passive localization) include radar, SLAM, and LiDAR, etc. However, conventional cellular networks (e.g., LTE and 5G) don't have the capability of scatterer localization. Further, some of the approaches rely on haptic recognition to determine the material of the objects. Haptic-recognition-based method requires direct contact with the object using haptic sensor that relies on pressing and sliding interactions with the object to determine its material properties. Such conditions of direct contact might be hard to achieved in some practical application.

Therefore, the manner for material identification and location needs to be improved.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The conventional methods, such as haptic-based methods, require a dedicated hardware for material detection, and can't identify material of an object that is located at a significant distance. However, more than often in new and emerging use cases such as robotic perception, VR applications and 3D mapping of an environment material detection of an object needs to be done from a significant distance to ensure reliable robot-human collaboration in a factory floor for example. Particularly, in some instance, the material identification and localization need to be done simultaneously.

Certain aspects of the present disclosure and their embodiments may provide solutions to these or other challenges. There are, proposed herein, various embodiments which address one or more of the issues disclosed herein. Improved methods and apparatuses are provided for material identification and localization. For example, a property change of a wireless signal caused by a reflection at a material may be used to identify the material and locate a scatterer. Therefore, identifying a material with location information from a significant distance without requiring close interaction may be achieved.

According to a first aspect of the present disclosure, there is provided a method performed by a reception apparatus. The method may comprise determining a reflection loss of a power of a wireless signal caused by a reflection at an object, for the purpose of identifying a material of the object and localizing a position of the object.

In embodiments of the present disclosure, the method may further comprise indicating a transmission apparatus to transmit the wireless signal to the object. The wireless signal may be reflected by the object to a reception apparatus. The method may further comprise receiving, from the reception apparatus, information about the wireless signal; and identifying the material and position of the object, based on the information about the wireless signal.

In embodiments of the present disclosure, the information about the wireless signal may include the reflection loss.

In embodiments of the present disclosure, the information about the wireless signal may include at least one of: a power of the wireless signal at the reception apparatus, angle of departure, angle of arrival, or time of flight; and the identification apparatus may calculate the reflection loss, based on the information about the wireless signal.

In embodiments of the present disclosure, the reflection loss may be calculated based on a power of the wireless signal at the transmission apparatus, a power of the wireless signal at the reception apparatus, and a propagation loss along a propagation path from the transmission apparatus to the object and then to the reception apparatus.

In embodiments of the present disclosure, the propagation loss may be calculated, based on a frequency of the wireless signal and a length of the propagation path; or the propagation loss may be measured, when the wireless signal is transmitted along another propagation path being directly from the transmission apparatus to the reception apparatus and having the same length of the propagation path.

In embodiments of the present disclosure, the length of the propagation path may be calculated based on time of flight measurement.

In embodiments of the present disclosure, the material of the object may be identified based on the reflection loss, a frequency of the wireless signal, and an incident angle of the wireless signal to the object.

In embodiments of the present disclosure, the incident angle of the wireless signal may be calculated based on positions of the transmission apparatus, and the object.

In embodiments of the present disclosure, the incident angle may be bigger or equal to zero degrees, and may be less than 90 degrees.

In embodiments of the present disclosure, identifying the material of the object may comprise searching a database to match the reflection loss.

In embodiments of the present disclosure, the database may record different reflection losses corresponding to different types of materials, different frequencies and different incident angles.

In embodiments of the present disclosure, the material of the object may be identified as a type corresponding to a matching result, when the matching result is obtained.

In embodiments of the present disclosure, the identification apparatus may indicate the transmission apparatus to transmit other wireless signal to the object, for identifying the material of the object, when two or more matching results are obtained; the other wireless signal may be reflected by the object to the reception apparatus; and the other wireless signal may have a different frequency or a different incident angle with the wireless signal.

In embodiments of the present disclosure, the other wireless signal and the wireless signal may be transmitted by the same antenna system of the transmission apparatus.

In embodiments of the present disclosure, the identification apparatus may be integrated with the transmission apparatus, or with the reception apparatus, or with both of the reception apparatus and the transmission apparatus.

In embodiments of the present disclosure, the identification apparatus may comprise a terminal device, or a network node.

In embodiments of the present disclosure, the network node comprises a base station.

In embodiments of the present disclosure, the object comprises a plurality of scatterers. The reflection loss comprises an overall reflection loss of the wireless signal induced by the plurality of scatterers, based on a transmission power, a reception power, and a free space path loss of the wireless signal.

In embodiments of the present disclosure, the method further comprises: calculating an overall path length of a trajectory of the wireless signal, based on time of flight measurement of the wireless signal.

In embodiments of the present disclosure, the method further comprises: determining at least one candidate trajectory of the wireless signal between the transmitter and the receiver, based at least on the overall path length; determining at least one candidate material combination with corresponding incident angle of each reflection, based at least on the overall reflection loss; and determining locations and a material combination for the plurality of scatterers, based on a candidate trajectory and a candidate material combination.

In embodiments of the present disclosure, determining the at least one candidate trajectory of the wireless signal between the transmitter and the receiver comprises: creating a plurality of trajectories, wherein each trajectory is created by connecting the transmitter, a first reflection point lying on a transmission line of the wireless signal, a second reflection point lying on a reception line of the wireless signal, and the receiver; and identifying at least one candidate trajectory, by matching the overall path length with each trajectory of the plurality of trajectories.

In embodiments of the present disclosure, determining at least one candidate material combination comprises: for a candidate trajectory of the at least one of candidate trajectory, applying in sequence each of a plurality of materials to the first reflection point, and the second reflection point; for the candidate trajectory of the at least one of candidate trajectory, calculating a plurality of reflection loss values, wherein each reflection loss value is calculated per a combination of: a first material and a first incident angle at the first reflection point, and a second material and a second incident angle at the second reflection point; and for the candidate trajectory of the at least one of candidate trajectory, identifying at least one candidate material combination, by matching the overall reflection loss with each of the plurality of reflection loss values. A material combination comprises a material at the first reflection point, and a material at the second reflection point.

In embodiments of the present disclosure, establishing at least one candidate material combination comprises: applying in sequence each of a plurality of materials to a first reflection point of a transmission line of the wireless signal, and to a second reflection point of a reception line of the wireless signal; applying in sequence each of a plurality of first incident angle to the first reflection point, and in sequence each of a plurality of second incident angle to the second reflection point; calculating a plurality of reflection loss values, wherein each reflection loss value is calculated per a combination of: a material and a corresponding first incident angle at the first reflection point, and a material and a corresponding second incident angle at the second reflection point; identifying at least one candidate material combination, by matching the overall reflection loss with each of the plurality of reflection loss values. A material combination comprises a material as well as a corresponding first incident angle at the first reflection point, and a material as well as a corresponding second incident angle at the second reflection point.

In embodiments of the present disclosure, establishing at least one candidate trajectory of the wireless signal between the transmitter and the receiver comprises: for a candidate material combination of the at least one candidate material combination, locating a corresponding first reflection point lying on the transmission line, wherein a corresponding first incident angle is satisfied at the corresponding first reflection point; for the candidate material combination of the at least one candidate material combination, locating a corresponding second reflection point lying on the reception line, wherein a corresponding second incident angle is satisfied at the corresponding second reflection point; for the candidate material combination of the at least one candidate material combination, creating a trajectory by connecting the transmitter, the corresponding first reflection point, the corresponding second reflection point, and the receiver; identifying at least one candidate trajectory, by matching the overall path length with each created trajectory.

In embodiments of the present disclosure, determining the locations and the material combination of the plurality of scatterers comprises: determining that a location of a scatterer of the plurality of scatters is at the first reflection point and/or the second reflection point of a matched candidate trajectory corresponding to a matched candidate material combination; and determining that each scatterer of the plurality of scatterers has a material of the matched candidate material combination corresponding to the matched candidate trajectory.

In embodiments of the present disclosure, the method further comprises: discretizing a transmission line of the wireless signal with a plurality of candidate points for the first reflection points; and discretizing a reception line of the wireless signal with a plurality of candidate points for the second reflection points.

In embodiments of the present disclosure, distances between two adjacent candidate points are the same.

According to a second aspect of the present disclosure, there is provided a method performed by a reception apparatus. The method may comprise receiving a wireless signal transmitted from a transmission apparatus and reflected by an object; and transmitting, to an identification apparatus, information about the wireless signal.

In embodiments of the present disclosure, the information about the wireless signal may include at least one of: a reflection loss of a power of the wireless signal caused by a reflection at the object, angle of departure, angle of arrival, or time of flight; or the information about the wireless signal may include a power of the wireless signal at the reception apparatus.

In embodiments of the present disclosure, the method may further comprise receiving, other wireless signal transmitted from the transmission apparatus and reflected by the object. The other wireless signal has a different frequency or a different incident angle with the wireless signal.

In embodiments of the present disclosure, the reception apparatus may be integrated with the identification apparatus, or with the transmission apparatus, or with both of the identification apparatus and the transmission apparatus.

In embodiments of the present disclosure, the reception apparatus may comprise a terminal device, or a network node.

In embodiments of the present disclosure, the network node may comprise a base station.

According to a third aspect of the present disclosure, there is provided a method performed by a transmission apparatus. The method may comprise receiving an indication for identifying a material of an object; and transmitting a wireless signal reflected by the object to a reception apparatus.

In embodiments of the present disclosure, the method further comprising: transmitting other wireless signal reflected by the object to the reception apparatus for identifying the material of the object. The other wireless signal has a different frequency or a different incident angle with the wireless signal.

In embodiments of the present disclosure, the other wireless signal and the wireless signal may be transmitted by the same antenna system of the transmission apparatus.

In embodiments of the present disclosure, the transmission apparatus may be integrated with the identification apparatus, or with the reception apparatus, or with both of the identification apparatus and the reception apparatus.

In embodiments of the present disclosure, the transmission apparatus may comprise a terminal device, or a network node.

In embodiments of the present disclosure, the network node may comprise a base station.

According to a fourth aspect of the present disclosure, there is provided an identification apparatus. The identification apparatus may comprise a processor, and a memory. The memory may contain instructions executable by the processor. The identification apparatus may be operative to determine a reflection loss of a power of a wireless signal caused by a reflection at an object, for the purpose of identifying a material of the object and localizing a position of the object.

In embodiments of the present disclosure, the identification apparatus may be further operative to perform the method according to any of embodiments above mentioned.

According to a fifth aspect of the present disclosure, there is provided a reception apparatus. The reception apparatus may comprise a processor, and a memory. The memory may contain instructions executable by the processor. The reception apparatus may be operative to receive a wireless signal transmitted from a transmission apparatus and reflected by an object; and transmit, to an identification apparatus, information about the wireless signal.

In embodiments of the present disclosure, the reception apparatus may be further operative to perform the method according to any of embodiments above mentioned.

According to a sixth aspect of the present disclosure, there is provided a transmission apparatus. The transmission apparatus may comprise a processor, and a memory. The memory may contain instructions executable by the processor. The transmission apparatus may be operative to receive an indication for identifying a material of an object; and transmit a wireless signal reflected by the object to a reception apparatus.

In embodiments of the present disclosure, the transmission apparatus may be further operative to perform the method according to any of embodiments above mentioned.

According to a seventh aspect of the present disclosure, there is provided an identification apparatus. The identification apparatus may comprise a determining unit, configured to determine a reflection loss of a power of a wireless signal caused by a reflection at an object, for the purpose of identifying a material of the object.

According to an eighth aspect of the present disclosure, there is provided a reception apparatus. The reception apparatus may comprise a receiving unit, configured to receive a wireless signal transmitted from a transmission apparatus and reflected by an object; and a transmitting unit, configured to transmit, to an identification apparatus, information about the wireless signal.

According to a ninth aspect of the present disclosure, there is provided a transmission apparatus. The transmission apparatus may comprise a receiving unit, configured to receive an indication for identifying a material of an object; and a transmitting unit, configured to transmit a wireless signal reflected by the object to a reception apparatus.

According to a tenth aspect of the present disclosure, there is provided a computer-readable storage medium storing instructions which when executed by at least one processor, cause the at least one processor to perform the method according to any of embodiments above mentioned.

Embodiments herein afford many advantages. For example, in embodiments herein, improved manner for identifying the material of an object and localizing a position of the object may be provided. In embodiments of the present disclosure, a material of the object/scatterer may be identified from a significant distance without requiring close interaction with the object/scatterer in and around the radio signal propagation path, while the position of the object/scatterer may be located at the same time. A person skilled in the art will recognize additional features and advantages upon reading the following detailed description.

BRIEF DESCRIPTION OF DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
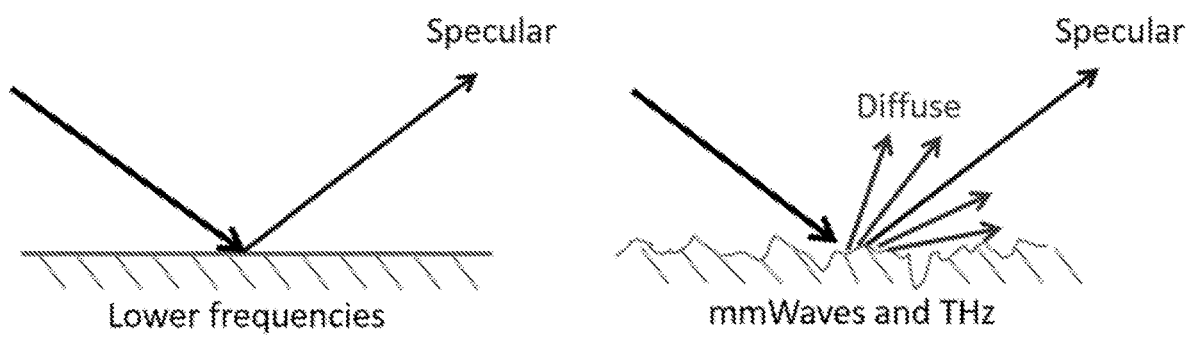
FIG. 1 is a diagram showing surface scattering at different frequencies.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the term "network" or "communication network" refers to a network following any suitable wireless communication standards. For example, the wireless communication standards may comprise $6^{th}$ generation (6G), $5^{th}$ generation (5G), new radio (NR), $4^{th}$ generation (4G), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols.

The term "apparatus" used herein may refer to a network device or network entity or network function or any other devices (physical or virtual) in a communication network, namely, a network node/device. For example, the "apparatus" in the network may include a base station (BS), an access point (AP), a multi-cell/multicast coordination entity (MCE), a server node/function (such as a service capability server/application server, SCS/AS, group communication service application server, GCS AS, application function, AF), an exposure node/function (such as a service capability exposure function, SCEF, network exposure function, NEF), a unified data management, UDM, a home subscriber server, HSS, a session management function, SMF, an access and mobility management function, AMF, a mobility management entity, MME, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the "apparatus" may comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like.

Further, the term "apparatus" may also refer to any suitable function which can be implemented in a network entity (physical or virtual) of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), OAM (Operation Administration and Maintenance) etc. In other embodiments, the network function may comprise different types of NFs (such as PCRF (Policy and Charging Rules Function), etc.) for example depending on the specific network.

The term "apparatus" may further refer to any end device that can access a communication network and receive services therefrom, namely, a terminal device. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and (or) B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Material identification is the process of identifying the material of an object and is a fundamental aspect of many new and emerging 6G use cases such as robotic perception, virtual reality (VR) applications, digital twins, and creating a 3D digital map of an environment. By identifying the material of surfaces and objects, robots can behave more intelligently during manipulation or handling of the objects. For example, by recognizing the objects' fragility, robot can adjust the grip of the arm appropriately; VR systems can activate additional human senses (e.g., touch and smell) by using material information in a 3D digital map; the supplemental material information can find applications in emerging area of virtual tourism due to COVID-19 (Corona Virus Disease-19) caused travel disruption.

Instead of haptic-recognition-based method, spectroscopy methods to determine the material of the objects may be considered. However, spectroscopy-based methods use interaction between object and electromagnetic radiation as a function of the wavelength of the radiation to recognize the material, and thus in this approach the test-object should be at a centimeter level distance from the detector.

Embodiments of the present disclosure consider the radio access technology (RAT), which has been extensively used to provide seamless connectivity between communication devices for high capacity and secure communication by means of wireless radio signal transmission and reception. When a radio signal is transmitted between wireless transmitter and receiver devices, the radio signal is affected by the presence of multiple scatterers in and around the propagation path. The radio signals typically undergo phenomena such as reflection, diffraction and refraction depending on the type and nature of the obstacle it encounters while travelling from a transmitter to a receiver. These phenomena typically result into multipath propagation of the radio signal, where the number and intensity of multipath propagation depends heavily on the number of scatterers and their locations in the propagation path together with the radio signal waveform characteristics such as bandwidth and carrier frequency. Evaluating the strength of the signals that arrive at receiver via scatterer induced multiple paths can therefore be used to establish an understanding of the type of scatterers that are located in and around the radio signal propagation environment. In embodiments of the present disclosure, a method, which exploits the signals received at the receiver via a specular path to identify the material of the scatterer that is located in and around the radio signal propagation path, is disclosed.

FIG. 1 is a diagram showing surface scattering at different frequencies.

For example, the surfaces of buildings, walls, and ceilings have usually been assumed to be electrically smooth because their surface height variations are smaller in comparison to the radio signal carrier wavelength at frequencies ranging up to mmWave. At lower frequencies, the reflection process is dominated by a strong specular path at an angle of reflection that is equal to the angle of incidence. The strong specular component virtually turns the surfaces into something that is close to "electrical mirror" suppressing the effect of scattered signal that are weaker in strength. However, in the frequency bands around and above mmWave bands, the roughness of surfaces becomes comparable to the radio signal carrier wavelength due to which the illuminated surface creates scattered signal paths, depending on the angle of incidence, that are as substantial as the reflected paths. Different frequencies exhibit different intensity of specular and/or diffuse scattering from most building surfaces, as depicted in FIG. 1. Most building surfaces appear smooth at lower frequencies resulting in the specular reflections dominating the multipaths (left side in FIG. 1), while same surfaces exhibit significant diffuse scattering and strong specular reflections at mmWave and THz (right side in FIG. 1). (Also see paper "Wireless Communications and Applications Above 100 GHz: Opportunities and Challenges for 6G and Beyond" THEODORE S. RAPPAPORT et. al. IEEE trans. June 2019).

Embodiments of the present disclosure provides specific manner to utilize such phenomena to identify the material of the objects/scatters.

Figure 2A:
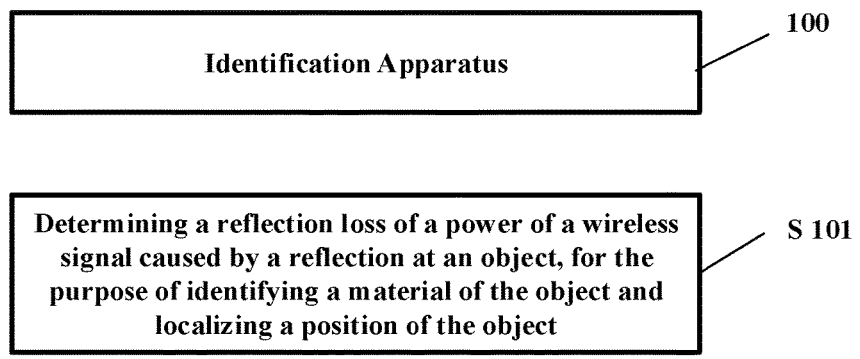
FIG. 2A is an exemplary flow chart showing a method performed by an identification apparatus, according to embodiments of the present disclosure.

FIG. 2A is an exemplary flow chart showing a method performed by an identification apparatus, according to embodiments of the present disclosure.

As shown in FIG. 2A, there is a method performed at the identification apparatus 100. The method may comprise: S101, determining a reflection loss of a power of a wireless signal caused by a reflection at an object, for the purpose of identifying a material and localizing a position of the object (namely, positioning, or locating the object).

According to embodiment of the present disclosure, by utilizing reflection loss of a power of a wireless signal caused by a reflection at an object, the material of the object/scatterer may be identified from a significant distance without requiring close interaction with the object/scatterer in and around the radio signal propagation path.

The identification apparatus may comprise any kind of computing device, such as any terminal device, any network node, and/or any kind of server, etc.

Figure 2B:
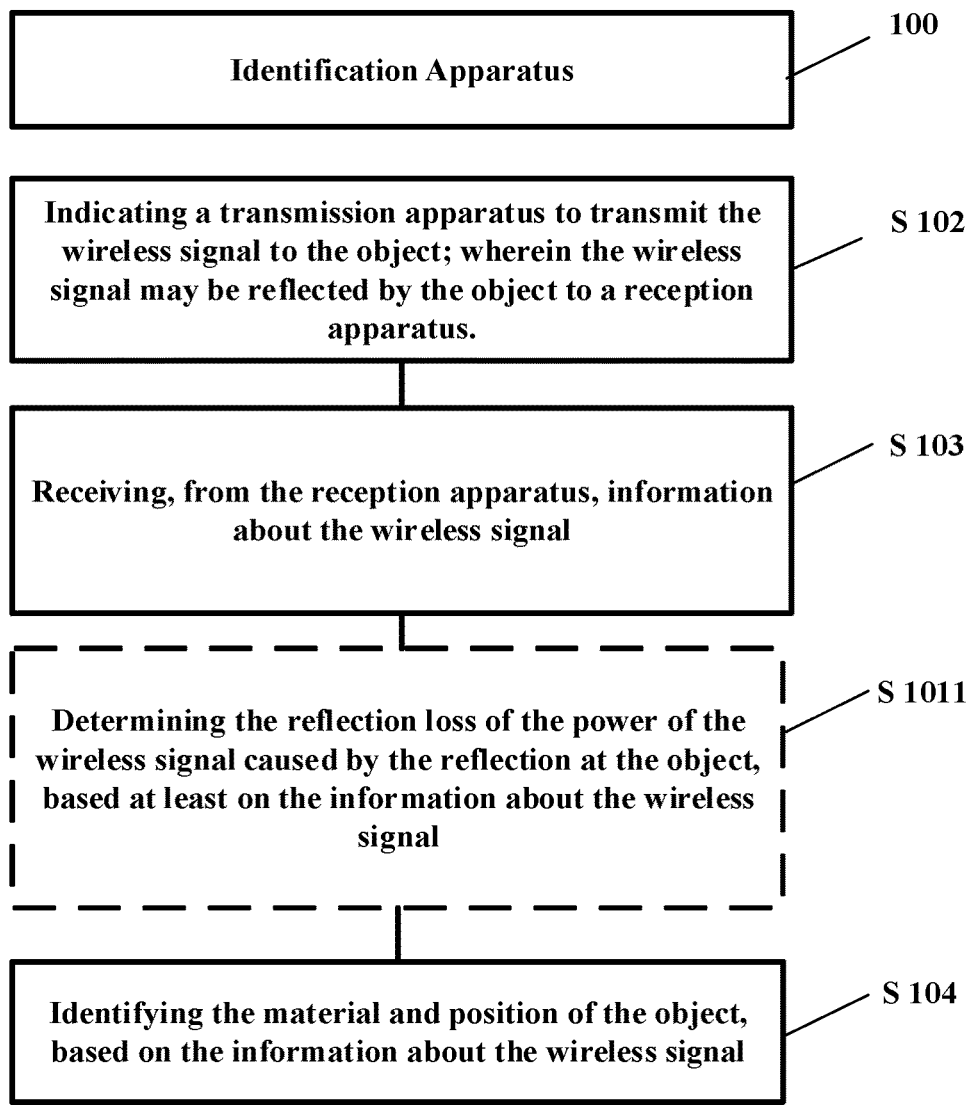
FIG. 2B is an exemplary flow chart showing additional steps of the method performed at the identification apparatus, according to embodiments of the present disclosure.

FIG. 2B is an exemplary flow chart showing additional steps of the method performed at the identification apparatus, according to embodiments of the present disclosure.

As shown in FIG. 2B, the method may further comprise S102, indicating a transmission apparatus to transmit the wireless signal to the object; wherein the wireless signal may be reflected by the object to a reception apparatus. The wireless signal may be reflected by the object to a reception apparatus. The method may further comprise S103, receiving, from the reception apparatus, information about the wireless signal; S1011 (optional), determining the reflection loss of the power of the wireless signal caused by the reflection at the object, based at least on the information about the wireless signal; and S104, identifying the material and position of the object, based on the information about the wireless signal (such as at least the reflection loss).

According to embodiment of the present disclosure, the identification apparatus 100 may be implemented in a wireless communication system, including a transmission apparatus and a reception apparatus.

In embodiments of the present disclosure, the information about the wireless signal may include the reflection loss.

In embodiments of the present disclosure, the information about the wireless signal may include at least one of: a power of the wireless signal at the reception apparatus, angle of departure, angle of arrival, or time of flight; and the identification apparatus may calculate the reflection loss, based on the information about the wireless signal.

According to embodiment of the present disclosure, the functions of the identification apparatus 100, the transmission apparatus, and the reception apparatus may be flexibly arranged. For example, the reception apparatus may calculate the reflection loss when receiving the wireless signal and then transmit the reflection loss to the identification apparatus 100. Alternatively, the reception apparatus may transmit relevant information to the identification apparatus 100, and then the identification apparatus 100 may calculate the reflection loss.

In embodiments of the present disclosure, the reflection loss may be calculated based on a power of the wireless signal at the transmission apparatus, a power of the wireless signal at the reception apparatus, and a propagation loss along a propagation path from the transmission apparatus to the object and then to the reception apparatus.

According to embodiment of the present disclosure, a propagation loss along a propagation path from the transmission apparatus to the object and then to the reception apparatus may be also considered for a more accurate calculation of the reflection loss at the surface of the object.

In embodiments of the present disclosure, the propagation loss may be calculated, based on a frequency of the wireless signal and a length of the propagation path; or the propagation loss may be measured, when the wireless signal is transmitted along another propagation path being directly from the transmission apparatus to the reception apparatus and having the same length of the propagation path.

In embodiments of the present disclosure, the length of the propagation path may be calculated based on time of flight measurement.

According to embodiment of the present disclosure, for calculating the propagation loss along a propagation path from the transmission apparatus to the object, either theoretical estimating manner or actually measuring manner may be utilized.

In embodiments of the present disclosure, the material of the object may be identified based on the reflection loss, a frequency of the wireless signal, and an incident angle of the wireless signal to the object.

In embodiments of the present disclosure, the incident angle of the wireless signal may be calculated based on positions of the transmission apparatus, and the object.

In embodiments of the present disclosure, the incident angle may be bigger or equal to zero degrees, and may be less than 90 degrees.

In different frequencies and/or different incident angles, the reflection losses at the same material may be different. The frequencies and incident angles may be also considered to provide more accurate identification.

When the incident angle is equal to zero degrees, the transmission apparatus and the reception apparatus may be arranged in the same normal line of the surface of the object, or even the transmission apparatus and reception apparatus may be integrated as the same device.

Figure 2C:
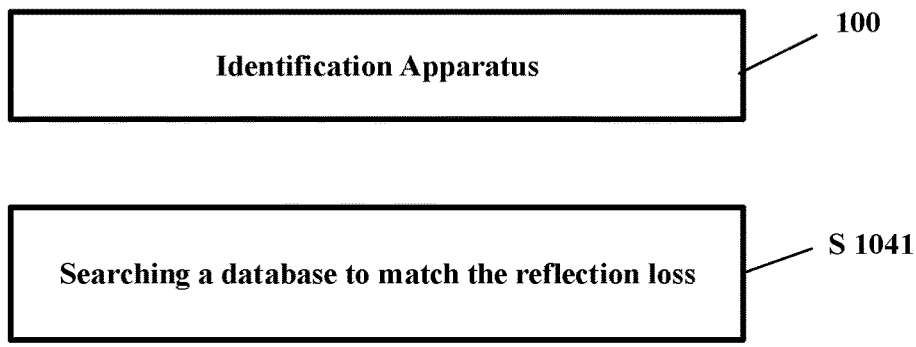
FIG. 2C is another exemplary flow chart showing another additional step of the method performed at the identification apparatus, according to embodiments of the present disclosure.

FIG. 2C is another exemplary flow chart showing another additional step of the method performed at the identification apparatus, according to embodiments of the present disclosure.

As shown in FIG. 2C, identifying the material of the object may comprise: S1041, searching a database to match the reflection loss.

In embodiments of the present disclosure, the database may record different reflection losses corresponding to different types of materials, different frequencies and different incident angles.

In embodiments of the present disclosure, the material of the object may be identified as a type corresponding to a matching result, when the matching result is obtained.

According to embodiments of the present disclosure, software simulating or actual measuring manner may be used to obtain necessary information (such as reflection loss corresponding to different materials, under different frequencies and/or incident angles, etc.), to previously create the database. Then, the material of the object may be quickly identified by searching such database.

In embodiments of the present disclosure, the identification apparatus may indicate the transmission apparatus to transmit other wireless signal to the object, for identifying the material of the object, when two or more matching results are obtained; the other wireless signal may be reflected by the object to the reception apparatus; and the other wireless signal may have a different frequency or a different incident angle with the wireless signal.

According to embodiments of the present disclosure, if two materials correspond to the same or similar reflection loss under a specific frequency, another frequency may be considered. Generally, two different materials cannot always correspond to the same or similar reflection loss, when frequency changes.

In embodiments of the present disclosure, the other wireless signal and the wireless signal may be transmitted by the same antenna system of the transmission apparatus.

Two different frequencies may have big difference, such that they may be generated by two different antenna system. However, if different frequencies have small offset with each other, they may be generated by the same antenna system.

In embodiments of the present disclosure, the identification apparatus may be integrated with the transmission apparatus, or with the reception apparatus, or with both of the reception apparatus and the transmission apparatus.

In embodiments of the present disclosure, the identification apparatus may comprise a terminal device, or a network node.

In embodiments of the present disclosure, the network node comprises a base station.

It should be understood, any specific frequency may be utilized, as long as enough estimating or measuring data for different materials under such specific frequency exists. Some of frequency may be preferred, if existing or developing wireless communication systems (including any kind of terminal devices, or any kind of network nodes) are chose to implement such method. Such selection may further reduce the implementation cost or extending the application scenarios. Particularly, any terminal device or network node (with transmission, reception, and calculation capability) in the communication systems will be able to implement the method individually.

Figure 3A:
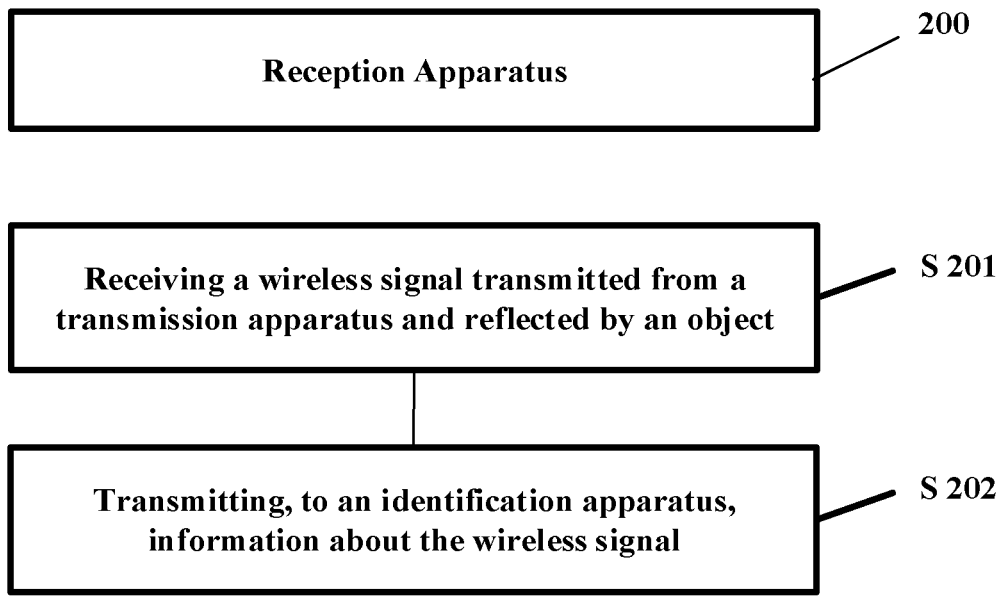
FIG. 3A is an exemplary flow chart showing a method performed by a reception apparatus, according to embodiments of the present disclosure.

FIG. 3A is an exemplary flow chart showing a method performed by a reception apparatus, according to embodiments of the present disclosure.

As shown in FIG. 3A, there is provided a method performed by a reception apparatus 200. The method may comprise: S201, receiving a wireless signal transmitted from a transmission apparatus and reflected by an object; and S202, transmitting, to an identification apparatus, information about the wireless signal.

In embodiments of the present disclosure, the information about the wireless signal may include at least one of: a reflection loss of a power of the wireless signal caused by a reflection at the object, angle of departure, angle of arrival, or time of flight; or the information about the wireless signal may include a power of the wireless signal at the reception apparatus.

Figure 3B:
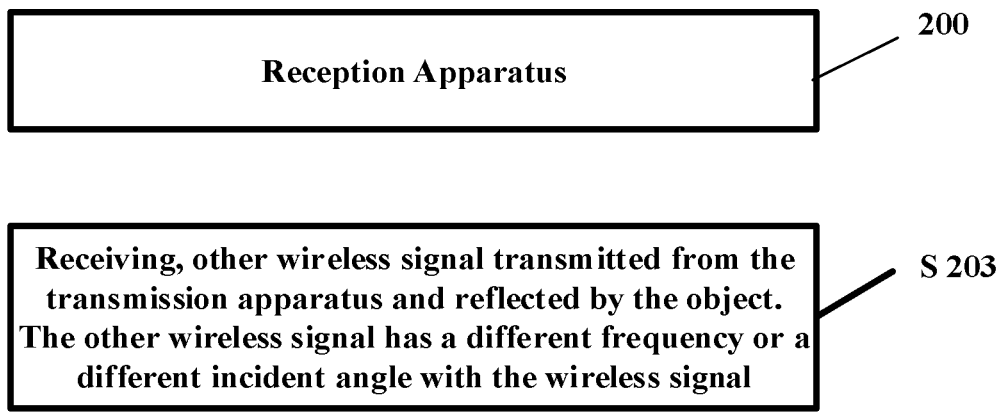
FIG. 3B is another exemplary flow chart showing another additional step of the method performed at the reception apparatus, according to embodiments of the present disclosure.

FIG. 3B is another exemplary flow chart showing another additional step of the method performed at the reception apparatus, according to embodiments of the present disclosure.

In embodiments of the present disclosure, the method may further comprise: S203, receiving, other wireless signal transmitted from the transmission apparatus and reflected by the object. The other wireless signal has a different frequency or a different incident angle with the wireless signal.

In embodiments of the present disclosure, the reception apparatus may be integrated with the identification apparatus, or with the transmission apparatus, or with both of the identification apparatus and the transmission apparatus.

In embodiments of the present disclosure, the reception apparatus may comprise a terminal device, or a network node.

In embodiments of the present disclosure, the network node may comprise a base station.

Figure 3C:
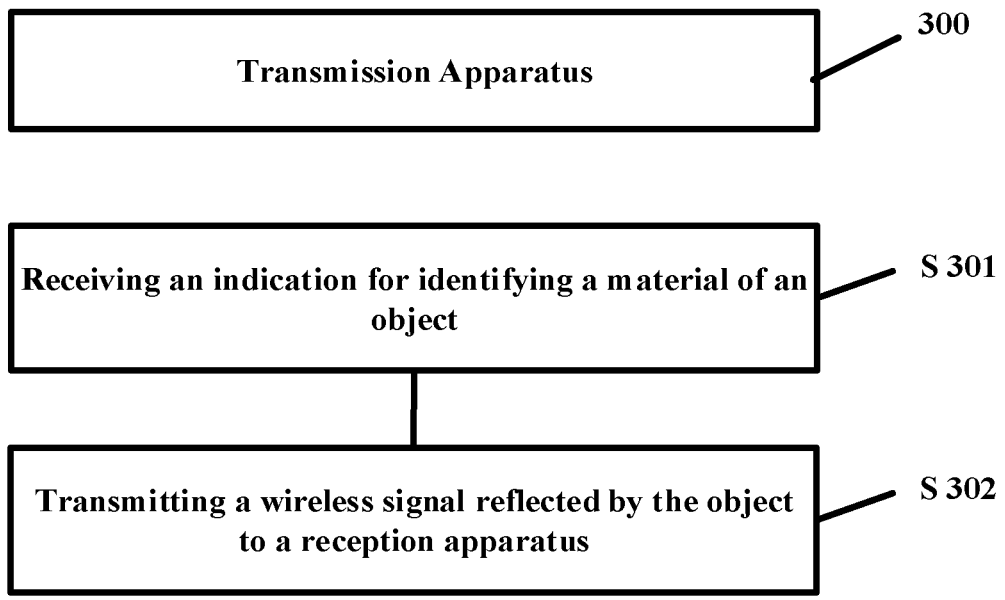
FIG. 3C is an exemplary flow chart showing a method performed by a transmission apparatus, according to embodiments of the present disclosure.

FIG. 3C is an exemplary flow chart showing a method performed by a transmission apparatus, according to embodiments of the present disclosure.

As shown in FIG. 3C, there is provided a method performed by a transmission apparatus 300. The method may comprise: S301, receiving an indication for identifying a material of an object; and S302, transmitting a wireless signal reflected by the object to a reception apparatus.

Figure 3D:
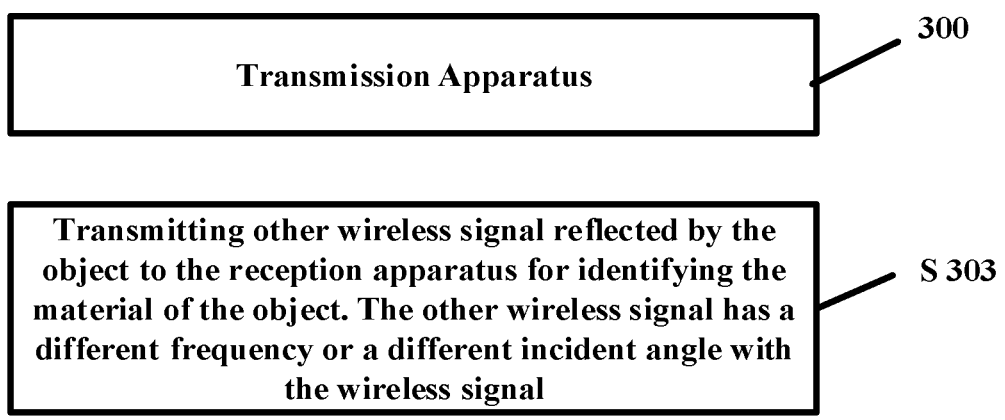
FIG. 3D is another exemplary flow chart showing another additional step of the method performed at the transmission apparatus, according to embodiments of the present disclosure.

FIG. 3D is another exemplary flow chart showing another additional step of the method performed at the transmission apparatus, according to embodiments of the present disclosure.

As shown in FIG. 3D, the method further comprising: S303, transmitting other wireless signal reflected by the object to the reception apparatus for identifying the material of the object. The other wireless signal has a different frequency or a different incident angle with the wireless signal.

In embodiments of the present disclosure, the other wireless signal and the wireless signal may be transmitted by the same antenna system of the transmission apparatus.

In embodiments of the present disclosure, the transmission apparatus may be integrated with the identification apparatus, or with the reception apparatus, or with both of the identification apparatus and the reception apparatus.

In embodiments of the present disclosure, the transmission apparatus may comprise a terminal device, or a network node.

In embodiments of the present disclosure, the network node may comprise a base station.

Implementation embodiments with further details will be described. These embodiments may further present specific manners for material recognition/identification using reflection of the wireless signal (such as radio signal) by objects in and around the propagation path (such as in a wireless communication network).

Figure 4:
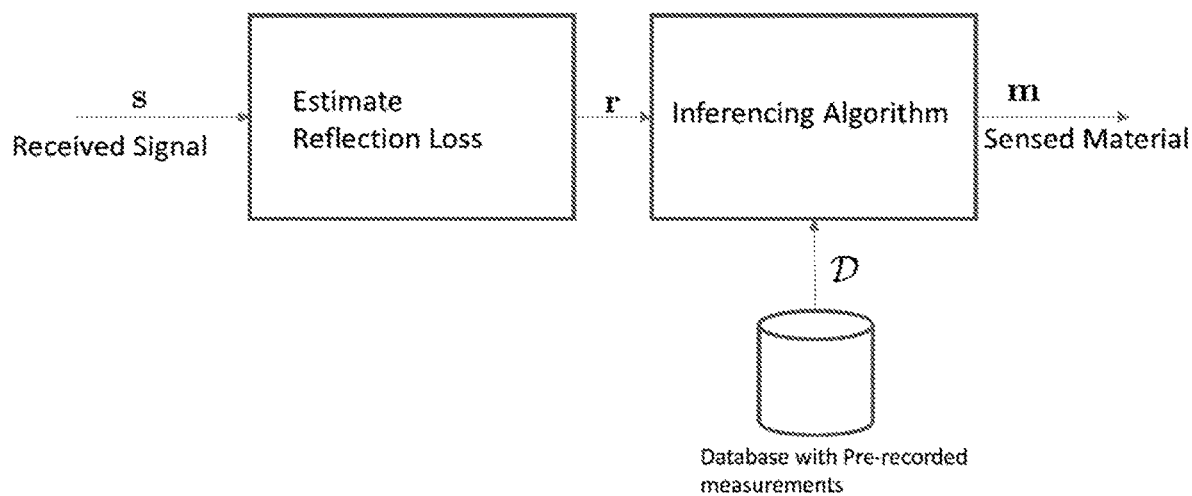
FIG. 4 is a diagram showing overall schematic of proposed material identification manner.

FIG. 4 is a diagram showing overall schematic of proposed material identification manner.

As shown in FIG. 4, the specific material may be identified based on comparing measured reflection of an electromagnetic signal from its surface with pre-recorded reflection losses from different materials that are recorded in a database.

The embodiments present a method for material recognition/identification in a wireless communication network by looking up premeasured reflection loss database. The method mainly comprises following steps.

Step 1: Measuring or simulating the reflection losses from different materials and recording them in a database at certain frequency/frequencies and incident angle/angles (database with pre-recorded measurements D).

Step 2: Transmitting a beam at certain frequency/frequencies towards the material from a transmitter at certain angle/angles and measuring reflection loss based on the received signal (S) at a receiver.

Step 3: Comparing the measured loss (estimated reflection loss, r) with pre-measured reflection losses from different materials that are recorded in a database, by an inferencing algorithm, to identify the material (sensed material, m).

This material identification method measures accurate reflection loss induced by objects to be recognized. Reflection losses of common materials in the environment are extensively investigated for wireless communication systems.

Figure 5:
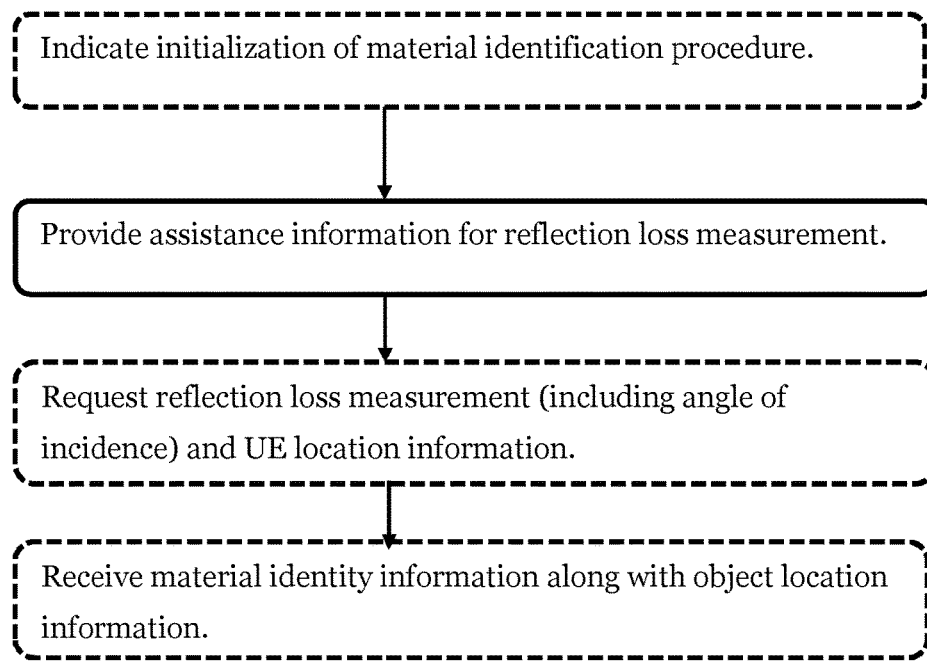
FIG. 5 is a flow chart showing a procedure at network perspective when the UE processes main identification steps.

FIG. 5 is a flow chart showing a procedure at network perspective when the UE processes main identification steps.

As shown in FIG. 5, the network side (such as any network node) may indicate initialization of material identification procedure. Then, the network side may provide assistance information for reflection loss measurement. The network side may request reflection loss measurement (including angle of incidence) and UE location information. At last, network side may receive material identity information along with object location information, from the UE.

In one of the embodiments it is provided that the network node provides assistance information to UE. The assistance information contains, not limited to, network node location, radio signal configuration (including beam IDs and angle of departure), and TRP (Transmission/Reception Point) orientation.

In embodiments it is provided that the UE node provides assistance information to the network node. The assistance information contains, not limited to, UE location, radio signal configuration (including beam IDs and angle of departure), and antenna panel orientation.

In embodiments it is provided that the steps in solid line boxes are mandatory steps to be conducted for the material detection and the steps in non-solid line boxes are complementary or non-mandatory steps that can be skipped depending on the apparatus that is the consumer of the material detection information.

Figure 6:
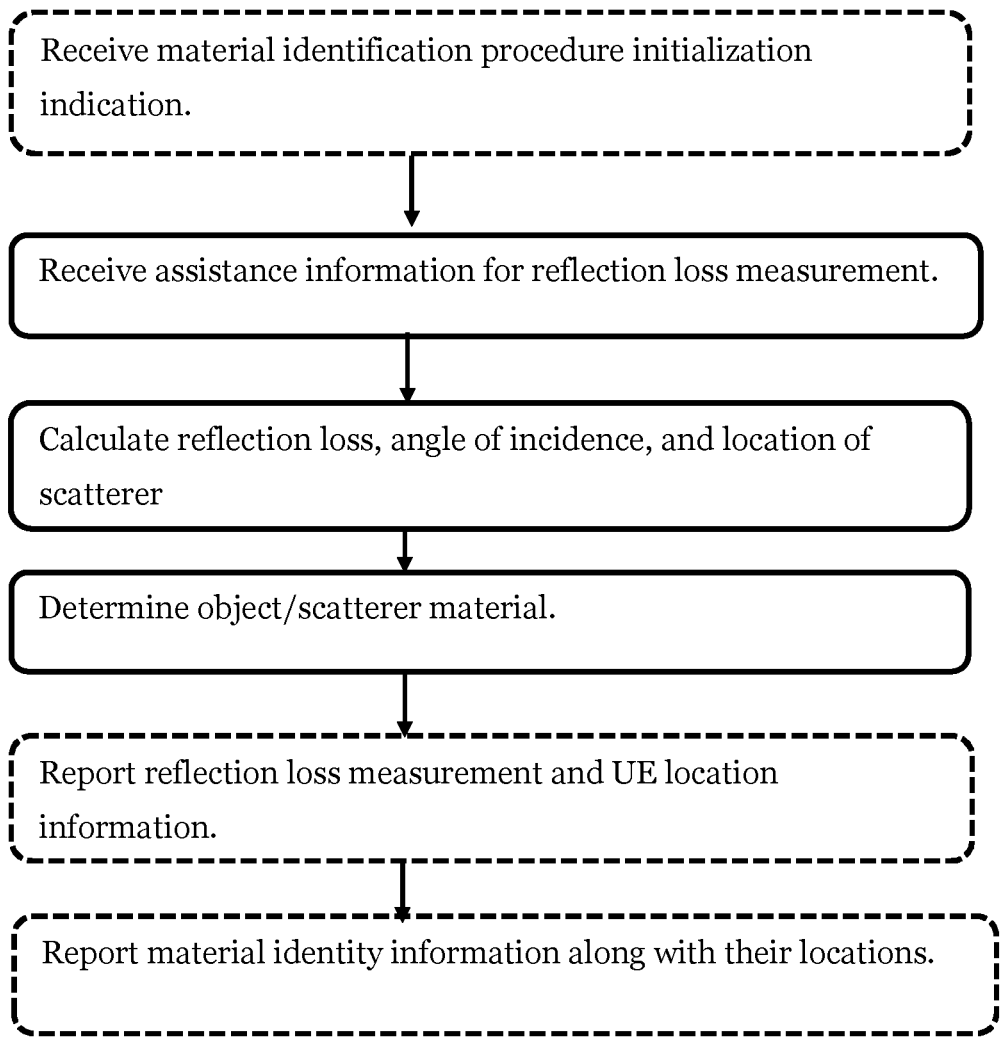
FIG. 6 is a flow chart showing a procedure at UE perspective when the UE processes main identification steps.

FIG. 6 is a flow chart showing a procedure at UE perspective when the UE processes main identification steps.

As shown in FIG. 6, the UE receives material identification procedure initialization indication. Then, the UE receives assistance information for reflection loss measurement. The UE calculates reflection loss, angle of incidence, and location of scatterer. The UE determines object/scatterer material. Then, the UE reports reflection loss measurement and UE location information. The UE may further report material identity information along with their locations.

Figure 7:
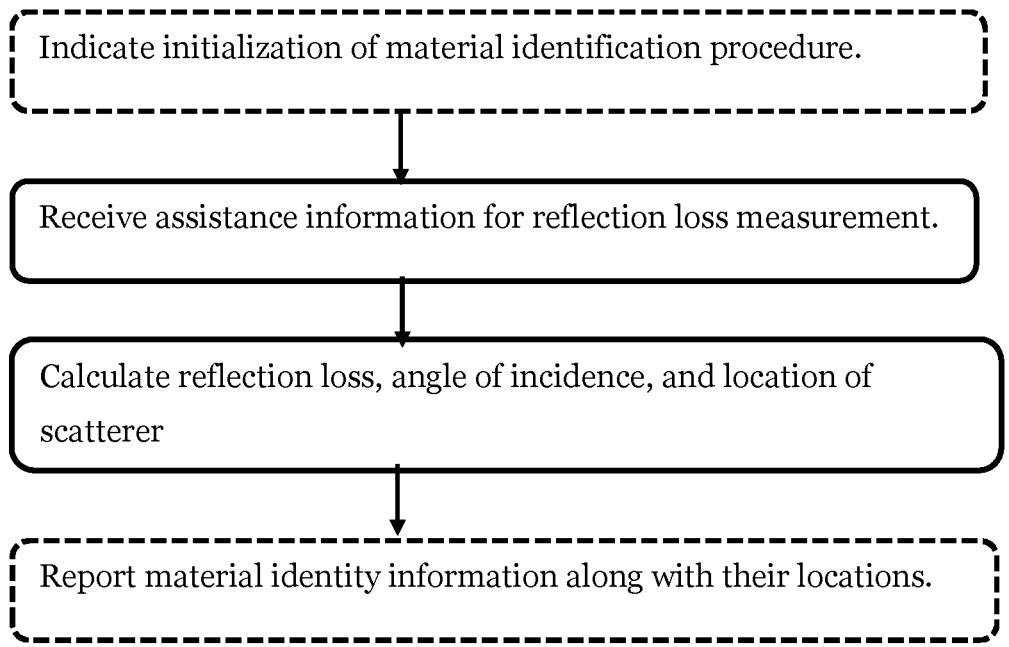
FIG. 7 is a flow chart showing a procedure at network perspective when the network processes main identification steps.

FIG. 7 is a flow chart showing a procedure at network perspective when the network processes main identification steps.

As shown in FIG. 7, the network side (such as any network node) indicates initialization of material identification procedure. Then, the network node indicates initialization of material identification procedure. The network node calculates reflection loss, angle of incidence, and location of scatterer. At last, the network node may report material identity information along with their locations.

Figure 8:
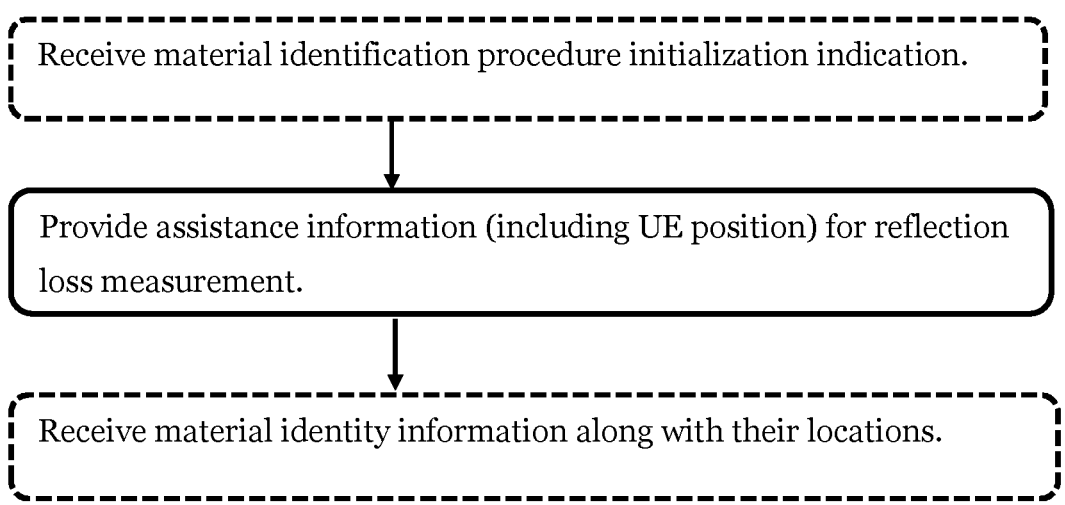
FIG. 8 is a flow chart showing a procedure at UE perspective when the network processes main identification steps.

FIG. 8 is a flow chart showing a procedure at UE perspective when the network processes main identification steps.

As shown in FIG. 8, the UE receives material identification procedure initialization indication. Then, the UE provides assistance information (including UE position) for reflection loss measurement. At last, the UE may receive material identity information along with their locations.

One of the advantages of the proposed solution is its capability of identifying a material of the object/scatterer from a significant distance without requiring close interaction with the object/scatterer in and around the radio signal propagation path.

Another advantage of the proposed solution is the method that corroborates on the fact that the radio signals are affected on a specific way by type, dimension, and texture of the scatterer, and may make use of the hardware and software in a typical wireless communication network and does not require any change from infrastructure point of view.

Further embodiments of the present disclosure may be illustrated below, which are applicable to further complicated situations. Particularly, in some further complicated situations, an accurate scatterer localization may be also need.

Some scatterer localization methods may already be proposed. Depending on whether the objects of interest have communication capability or not, the localization technologies are classified into active localization and passive localization. Active localization systems use transmitted and received signals both from localization system and objects with communication capability to localize the objects. Almost all RAT-based localization systems are active localization (e.g., localizing user equipment (UE) in a cellular network). Passive localization systems localize scatterers without communication capability by exploiting reflected signals induced by the scatterers (e.g., detecting a plane by using a bistatic radar).

Some existing scatterer localization technologies (passive localization) include radar, SLAM, and LiDAR. Conventional cellular networks (e.g., LTE and 5G) don't have the capability of scatterer localization. However, in future 6G, cellular network is expected to evolve with native support of radar capability with shared hardware and carrier frequencies. Radio-Access-Technology (RAT)-based scatterer localization system is one application of joint communication and sensing system (JCAS) that uses communication signals between transceivers to locate the scatterers in and around the propagation paths.

Particularly, unlike the existing passive localization use cases, some emerging 6G localization applications such as robotic perception, virtual reality (VR), digital twins, and three-dimensional (3D) digital mapping require scatterer information of not only the position but also the material. By combining the scatterers' location information with their material information of an environment, a 3D digital map with another layer of material information can be generated. This supplementary information in the 3D digital map can find applications in VR games and emerging area of virtual tourism due to COVID-19-caused travel disruption. Current VR suits can give visual and audio illusions by simulating human senses of sight and hearing. However, with material information in 3D digital map, VR applications can generate additional human sensations like touch and smell. For example, a VR game player can feel the hardness, the temperature, and the odour of the virtual objects in a simulated environment through sensory feedback. Material sensing can be a key requirement for autonomous driving (AD) also. Today the onboard radar systems of vehicles are capable of estimating precise position of obstacles around the vehicles. However, having an added information about the type of the material can aid in several ways. For example, by sensing the snow on the road, vehicle can tune its onboard electronics such as traction-control system or change to another safer route.

There are many challenges of RAT-based scatterer localization. For example, detecting and localizing scatterers surrounding radio transceivers in rich scattering environment is one of the emerging requirements of JCAS system. Most scatterer localization technologies trace radio trajectories and localize objects using 3D digital maps, ray tracing methods, and geometrical optics theory. These map-based localization methods can be implemented only when the corresponding maps of the environment are available to the localization systems. Therefore, map-based scatterer localization methods not only use cellular infrastructure but also depend on imported 3D map. However, 3D map is not the component of conventional cellular networks. Moreover, environmental changes are likely to happen frequently especially for indoor scenarios and lead to out-of-date information in the 3D digital maps. The objective of RAT-based scatterer localization is to sense and localize scatterers without requiring any external assistance beyond the scope of RAT capabilities, e.g., without importing the 3D digital map of an environment. With this restriction, tracing radio trajectory in rich scattering environment is quite challenging, because radio signals can be reflected by scatterers at unknown positions and attenuated by uncertain number of reflections. Possible information can be gleaned by RAT-based scatterer localization system including:

Angle of Departure (AOD);
Angle of Arrival (AOA);
Time of Flight (TOF);
Transmitted power and received power strength (RSS);
Positions of transmitters and receivers.

AOD and AOA represent transmitter- and receiver-side beam direction, respectively. TOF can be used to estimate the total path length. RSS at receiver side can be measured or calculated by link budget.

In rich scattering environment, non-line-of-sight (NLOS) radio signals typically undergo phenomena such as reflection, diffraction, and refraction. In this invention, reflection for localization purpose is considered. The reflection of NLOS trajectories can be either single- or multiple-bounce reflections. In prior works, the scatterer localization was done in a single-bounce context (single-bounce-assumption). Multiple-bounce reflection trajectories are excluded in most prior technologies to reduce the complexity of the localization algorithms. For example, typical scatterer localization system "radar" detects scatterers by exploiting single-bounce reflection. The sparse scatterers (e.g., planes and missiles) in the air make single-bounce-assumption reasonable for radar applications. Light-detection-and-ranging (LiDAR) localizes scatterers with laser by measuring the time for the single order reflection between the transceivers. However, such approaches may not be applicable to RAT-based scatterer localization systems deployed in rich scattering environments, in which a large number of multiple-bounce reflection paths exist, especially in urban areas or cluttered indoor scenarios. Radio signals in such environments are likely to be reflected multiple times. Therefore, single-bounce reflection may not be sufficient to characterize the sensing parameters of scatterers.

Figure 9A:
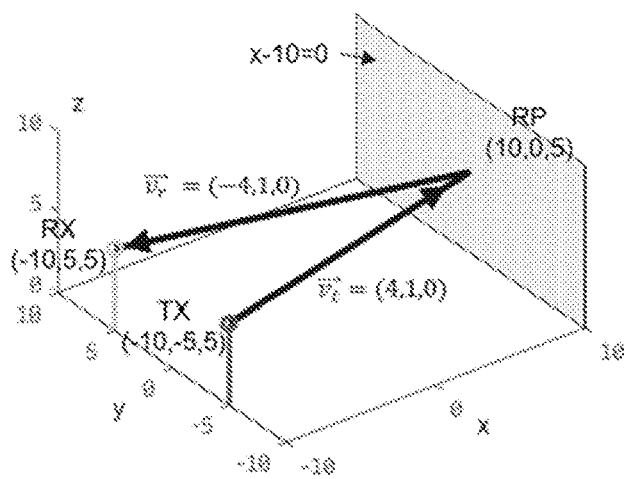
FIG. 9(a), FIG. 9(b), FIG. 9(c) show exemplary possible different trajectories of a radio ray transmitted from a TX and received at a RX, with different bounce times of the radio ray.
Figure 9B:
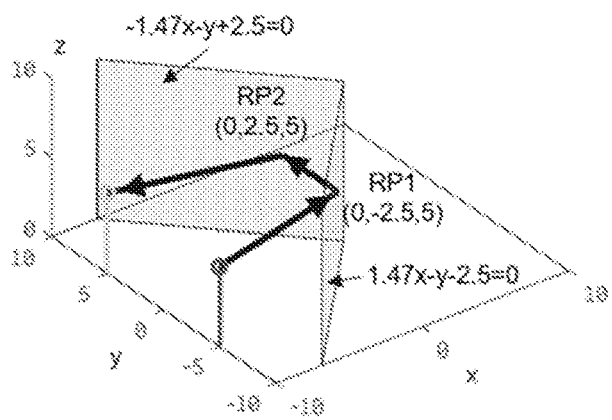
Figure 9C:
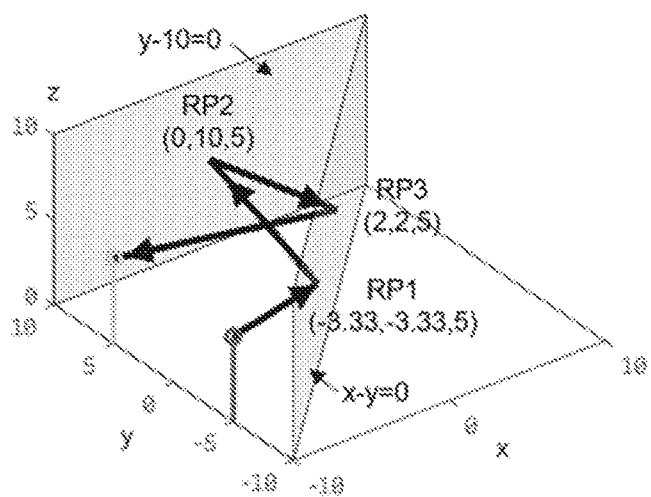

FIG. 9(a), FIG. 9(b), FIG. 9(c) shows the possible trajectories of a radio ray transmitted from TX (−10, −5, 5) in the direction of vector (4, 1, 0) and received at RX (−10, 5, 5) in the direction of vector (−4, 1, 0). FIG. 9(a) corresponds to single bounce, FIG. 9(b) corresponds to double bounces, and FIG. 9(c) corresponds to triple bounces.

With single-bounce-assumption, the sensing reliability and accuracy of RAT-based scatterer localization degrade in rich scattering environment. Scatterers may be mistakenly localized when radio rays are reflected between multiple scatterers. For example, as shown in FIG. 9(a)-9(c), a transmitter (TX) and a receiver (RX) are placed at (−10, −5, 5) and (−10, 5, 5) in a Cartesian coordinate, respectively. The TX transmits a narrow beam in the direction of vector $\vec{v}_t=(4, 1, 0)$, the RX receives the same beam in the direction of vector $\vec{v}_r=(-4, 1, 0)$. For this scenario, according to single-bounce-assumption, the reflection point (RP) should locate at (10, 0, 5), the radio ray should be reflected by the plane x−10=0 producing single-bounce reflection, the trajectory is described by point-to-point motion passing through the points TX(−10, −5, 5), RP(10, 0, 5), and RX(−10, 5, 5) as shown in FIG. 9(a). Note that the scatterer represented by the plane x−10=0 should be a larger surface than the radius of the first Fresnel zone. In order to demonstrate the spatial relationship between the trajectory and the scatterers, the scatterer is plotted to an appreciable rectangle. However, the trajectory in FIG. 9(a) may not represent the true trajectory of the radio ray. For example, if two scatterers represented by the planes 1.47x−y−2.5=0 and −1.47x−y+2.5=0 exist as shown in FIG. 9(b), then the radio ray is reflected twice by the two scatterers and propagates along the trajectory passing through the points TX(−10, −5, 5), RP1(0, −2.5, 5), RP2(0, 2.5, 5), and RX(−10, 5, 5). If two scatterers x−y=0 and y−10=0 exist as shown in FIG. 9(c), the radio ray is reflected three times by the two scatterers and propagates along the points TX(−10, −5, 5), RP1(−3.33, −3.33, 5), RP2(0, 10, 5), RP3(2, 2, 5), and RX(−10, 5, 5). Any RAT-based scatterer localization system based on single-bounce-assumption cannot distinguish the trajectories in FIG. 9(a)-(c) due to exactly the same TX/RX positions, AOD, and AOA from the transceivers' point of view. In rich scattering environments (e.g., urban canyon or indoor scenarios), there are abundant scatterers in and around the propagation paths, such multiple-bounce-dominant paths are mistakenly identified as single-bounce reflection by single-bounce-assumption localization technologies.

For example, as shown in FIG. 9(a) and FIG. 9(b), it may be assumed that the sensors of an autonomous driving (AD) vehicle locate at (−10, −5, 5) and (−10, 5, 5), two close obstacles (e.g., pedestrians or other vehicles) locate at (0, −2.5, 5) and (0, 2.5, 5). A single-bounce-assumption-based scatterer localization system cannot identify the two obstacles correctly: the two obstacles are identified as a single obstacle with wrong location (10, 0, 5) in the distance. This error may lead to wrong driving decision and fatal accident for AD.

Figure 10A:
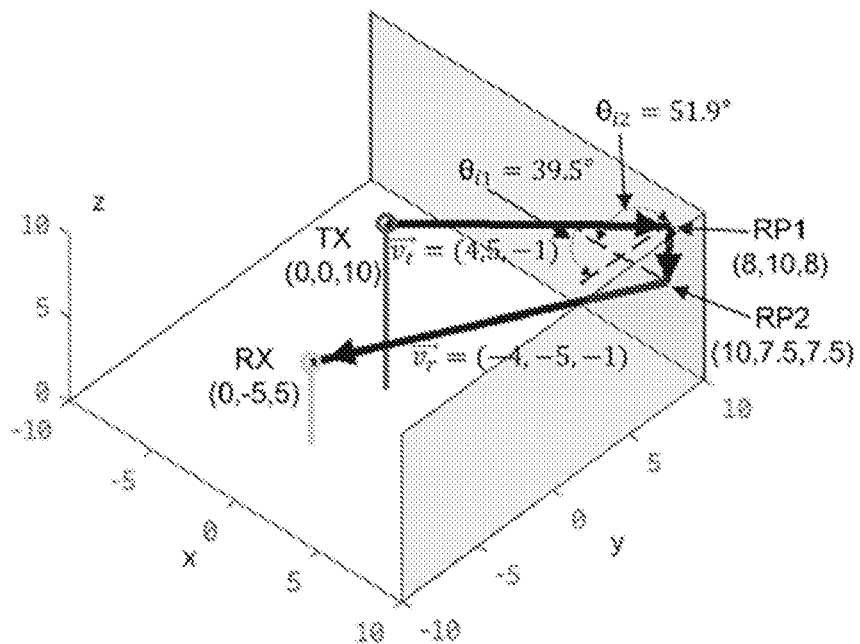
FIG. 10(a), FIG. 10(b), FIG. 10(c), FIG. 10(d) show exemplary possible different trajectories of a radio ray transmitted from a TX and received at a RX, even with the same bounce times and the same overall path length of the radio ray.
Figure 10B:
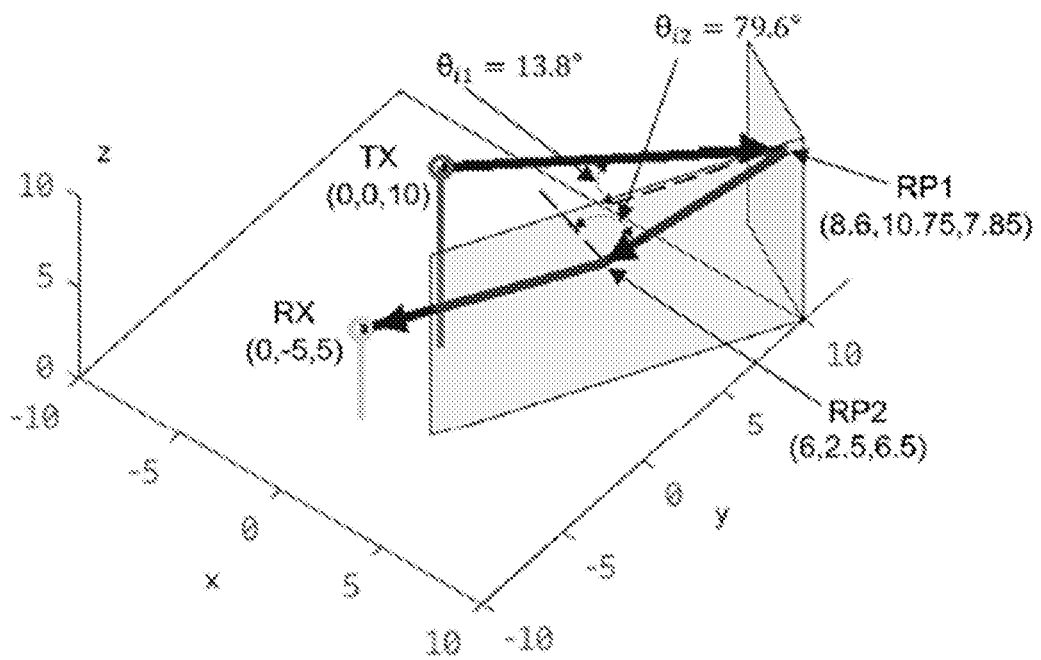
Figure 10C:
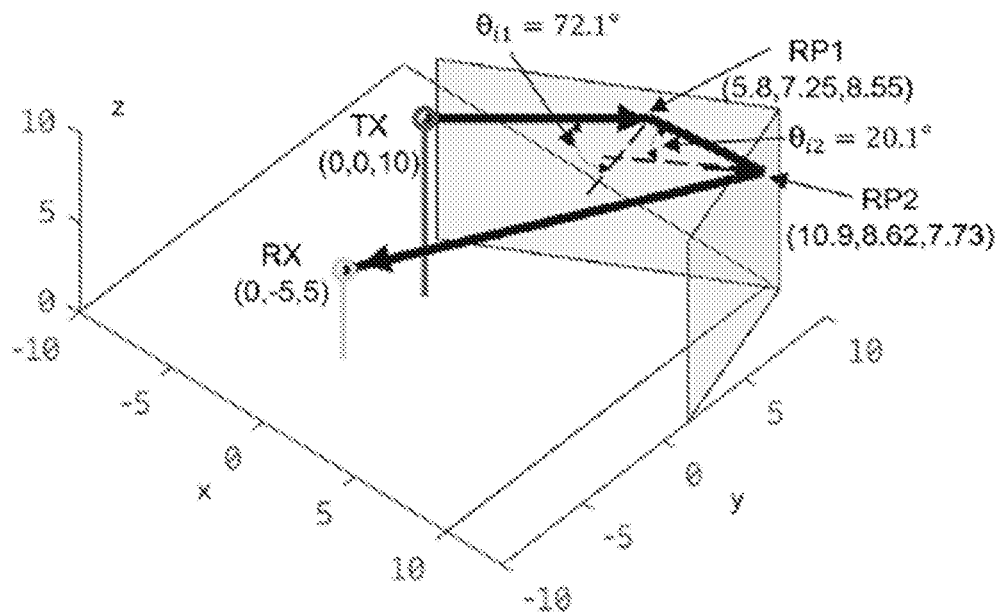
Figure 10D:
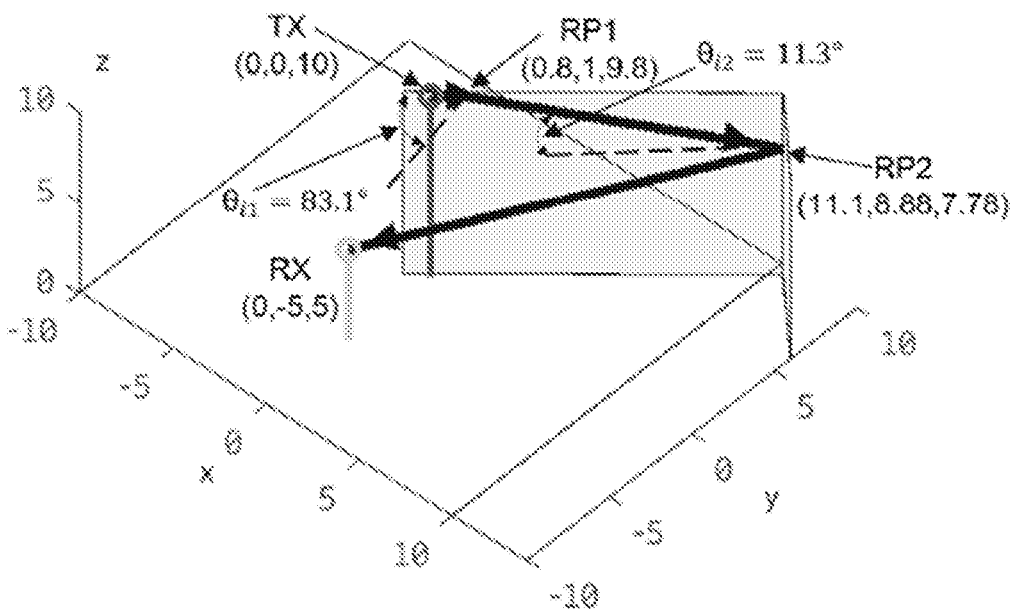

FIG. 10(a), FIG. 10(b), FIG. 10(c), FIG. 10(d) show four trajectories, which include four different scatterer layout, induce the same ray from TX(−10, −5, 5) in the direction of $\vec{v}_t=(4, 5, -1)$ to propagation along four different trajectories. However, from measurement point of view, all trajectories have same TX/RX locations, transmitter-side beam direction (4, 5, −1), receiver-side beam direction (−4, −5, −1), and overall path length of 32.4 m. FIG. 10(a) corresponds to a trajectory A, FIG. 10(b) corresponds to a trajectory B, FIG. 10(c) corresponds to a trajectory C, FIG. 10(d) corresponds to a trajectory D.

Even it is assumed that a RAT-based scatterer localization system knows the number of bounces of a radio ray, it still cannot precisely trace the trajectory and localize the scatterers. For example, as shown in FIG. 10(a), FIG. 10(b), FIG. 10(c), FIG. 10(d), the transmitter- and receiver-side beam direction of a radio ray between TX(0, 0, 10) and RX(0, −5, 5) are $\vec{v}_t=(4, 5, -1)$ and $\vec{v}_r=(-4, -5, -1)$, respectively. It is assumed that a RAT-based scatterer localization system knows the ray is reflected twice by the two surfaces of a dihedral. TOF is measured and the overall path length is 32.4 m. Different scatterers' location and orientation illustrated in FIG. 10(a)-(d) induce four different trajectories:

Trajectory A: TX(0, 0, 10) to RP1(8, 10, 8) to RP2(10, 7.5, 7.5) to RX(0, −5, 5),
Trajectory B: TX(0, 0, 10) to RP1(8.6, 10.75, 7.85) to RP2(6, 2.5, 6.5) to RX(0, −5, 5),
Trajectory C: TX(0, 0, 10) to RP1(5.8, 7.25, 8.55) to RP2(10.9, 8.625, 7.725) to RX(0, −5, 5),
Trajectory D: TX(0, 0, 10) to RP1(0.8, 1, 9.8) to RP2 (11.1, 8.875, 7.775) to RX(0, −5, 5).

It is hard to distinguish the true trajectory from trajectories A-D by conventional scatterer localization methods because trajectories A-D are characterized by same TX/RX locations, same transmitter- and receiver-side beam direction, and same overall path length of 32.4 m.

In summary, there are no RAT-based scatterer localization technologies (passive localization) so far. For some existing RAT-based active localization methods, single-bounce-assumption may lead to wrong localization and it is unacceptable for some use cases that require high reliability.

In embodiments of the present disclosure, it will be proposed with two further methods to localize scatterers and identify scatterers' material simultaneously in rich scattering environments.

The methods may be based on findings from RL (reflection loss) simulations and theoretical analysis: (1) most of the ΣRLs induced by different sequences-of-material are significantly different; (2) RL is dependent on material of scatterer, radio frequency, and incident angle only; (3) ΣRLs induced by multiple scatterers is independent of scatterers' sequence-of-material. By extracting material and incident angle information from RL, the RAT-based scatterer localization and material identification systems can be developed. The proposed methods will be able to support passive localization in a cost-effective manner by eliminating the need for dedicated hardware (e.g., sensor) and external assistance (e.g., 3D digital map database) by using only cellular infrastructure.

As for method 1, below exemplary embodiments may be further provided.

Figure 11:
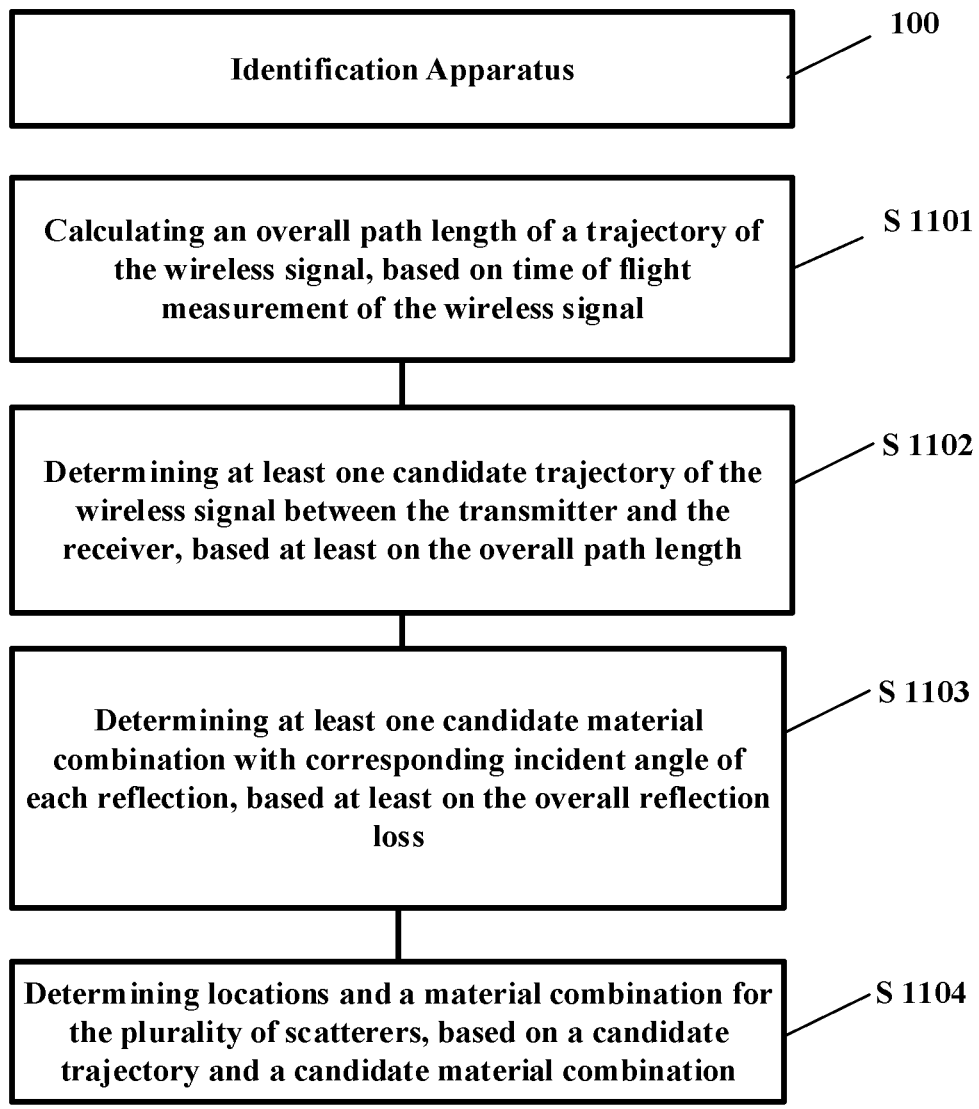
FIG. 11 is an exemplary flow chart showing further steps of a first method performed by an identification apparatus, according to embodiments of the present disclosure.

FIG. 11 is an exemplary flow chart showing further steps of a first method performed by an identification apparatus, according to embodiments of the present disclosure.

In embodiments of the present disclosure, the object comprises a plurality of scatterers. The reflection loss comprises an overall reflection loss of the wireless signal induced by the plurality of scatterers, based on a transmission power, a reception power, and a free space path loss of the wireless signal.

In embodiments of the present disclosure, the method further comprises: step S1101, calculating an overall path length of a trajectory of the wireless signal, based on time of flight measurement of the wireless signal.

In embodiments of the present disclosure, the method further comprises: step S1102, determining at least one candidate trajectory of the wireless signal between the transmitter and the receiver, based at least on the overall path length; step S1103, determining at least one candidate material combination with corresponding incident angle of each reflection, based at least on the overall reflection loss; and step S1104, determining locations and a material combination for the plurality of scatterers, based on a candidate trajectory and a candidate material combination.

According to embodiments of the present disclosure, locations and a material combination for the plurality of scatterers may be determined simultaneously. It should be also noted that the specific order for performing these steps is not limited.

Figure 12:
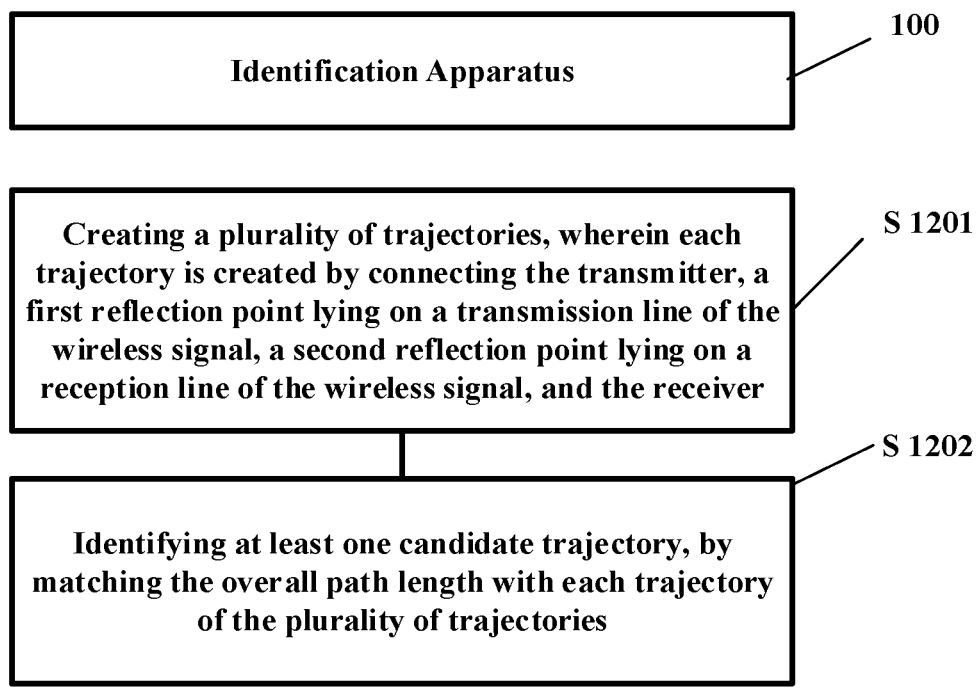
FIG. 12 is an exemplary flow chart showing further substeps of the method as shown in FIG. 11, according to embodiments of the present disclosure.

FIG. 12 is an exemplary flow chart showing further substeps of the method as shown in FIG. 11, according to embodiments of the present disclosure.

In embodiments of the present disclosure, the step S1102, determining the at least one candidate trajectory of the wireless signal between the transmitter and the receiver, comprises: step S1201, creating a plurality of trajectories, wherein each trajectory is created by connecting the transmitter, a first reflection point lying on a transmission line of the wireless signal, a second reflection point lying on a reception line of the wireless signal, and the receiver; and step S1202, identifying at least one candidate trajectory, by matching the overall path length with each trajectory of the plurality of trajectories.

According to the first method, the step S1102 relating to trajectory may be performed at first.

Figure 13:
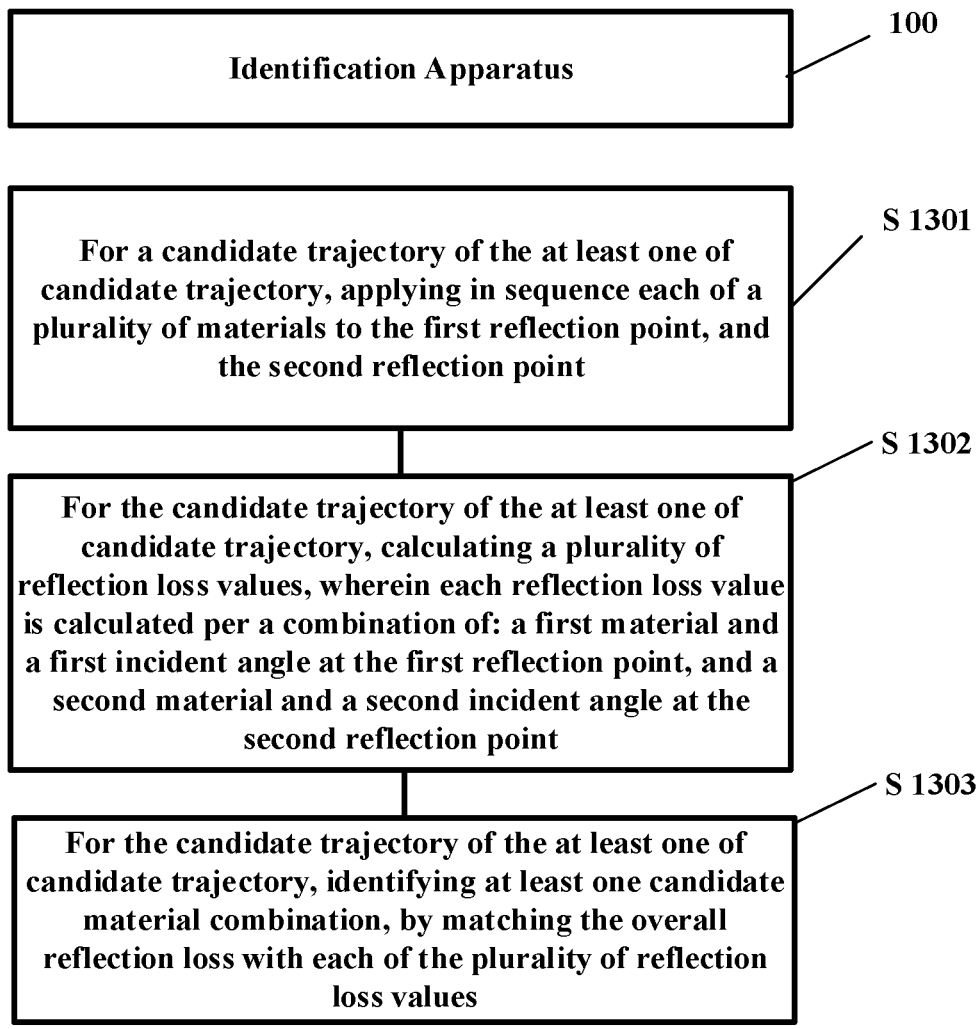
FIG. 13 is an exemplary flow chart showing further substeps of the method as shown in FIG. 11, according to embodiments of the present disclosure.

FIG. 13 is an exemplary flow chart showing further substeps of the method as shown in FIG. 11, according to embodiments of the present disclosure.

In embodiments of the present disclosure, step S1103, determining at least one candidate material combination comprises: step S1301, for a candidate trajectory of the at least one of candidate trajectory, applying in sequence each of a plurality of materials to the first reflection point, and the second reflection point; step S1302, for the candidate trajectory of the at least one of candidate trajectory, calculating a plurality of reflection loss values, wherein each reflection loss value is calculated per a combination of: a first material and a first incident angle at the first reflection point, and a second material and a second incident angle at the second reflection point; and step S1303, for the candidate trajectory of the at least one of candidate trajectory, identifying at least one candidate material combination, by matching the overall reflection loss with each of the plurality of reflection loss values. A material combination comprises a material at the first reflection point, and a material at the second reflection point.

According to the first method, the step S1103 relating to material may be performed later than step S1102.

Figure 14:
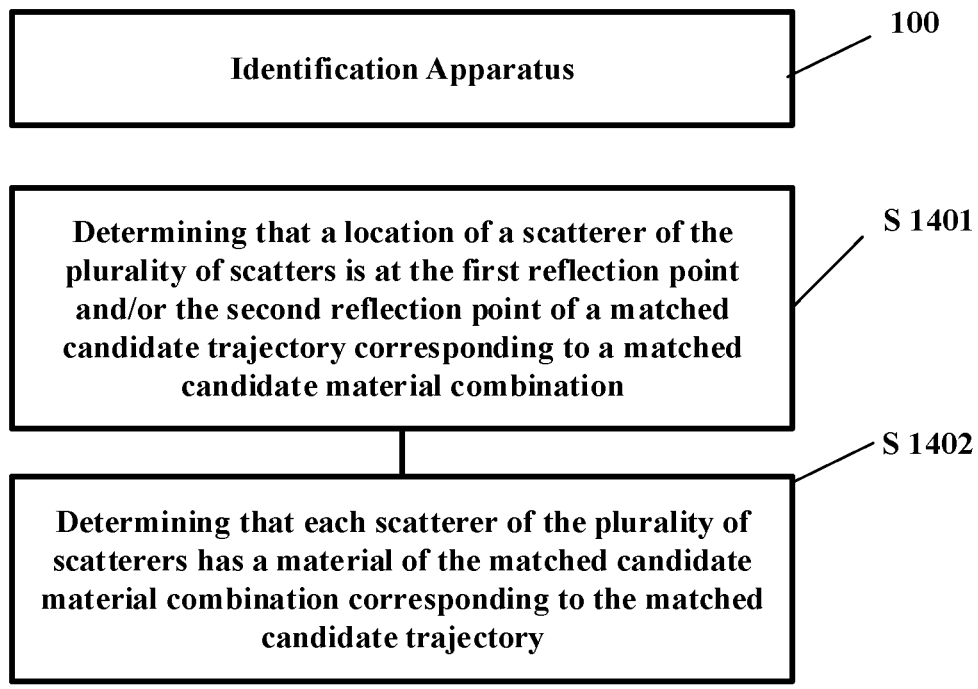
FIG. 14 is an exemplary flow chart showing further substeps of the method as shown in FIG. 11, according to embodiments of the present disclosure.

FIG. 14 is an exemplary flow chart showing further substeps of the method as shown in FIG. 11, according to embodiments of the present disclosure.

In embodiments of the present disclosure, S1104, determining the locations and the material combination of the plurality of scatterers comprises: S1401, determining that a location of a scatterer of the plurality of scatters is at the first reflection point and/or the second reflection point of a matched candidate trajectory corresponding to a matched candidate material combination; and S1402, determining that each scatterer of the plurality of scatterers has a material of the matched candidate material combination corresponding to the matched candidate trajectory.

According to embodiments, locations and a material combination for more than one scatterers may be determined simultaneously.

Figure 15:
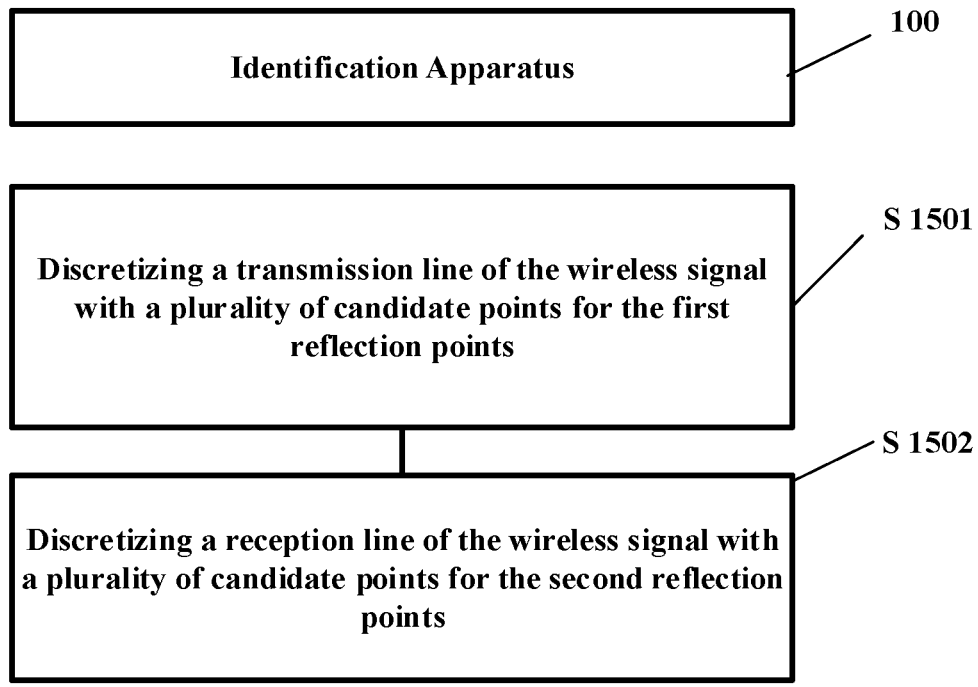
FIG. 15 is an exemplary flow chart showing further steps of the method as shown in FIG. 11, according to embodiments of the present disclosure.

FIG. 15 is an exemplary flow chart showing further steps of the method as shown in FIG. 11, according to embodiments of the present disclosure.

In embodiments of the present disclosure, the method further comprises: step S1501, discretizing a transmission line of the wireless signal with a plurality of candidate points for the first reflection points; and step S1502, discretizing a reception line of the wireless signal with a plurality of candidate points for the second reflection points.

In embodiments of the present disclosure, distances between two adjacent candidate points are the same.

According to embodiments of the present disclosure, the computation complexity and the accuracy may be adjusted/balanced by the distance between two adjacent candidate points. The bigger the distance, the less the complexity is and the less the accuracy is. The smaller the distance, the more the complexity is and the more the accuracy is.

Below, further detailed embodiments related to the above method will be illustrated.

To detailly study the impact of RL on scatterer localization, extensive reflection loss (RL) Simulations may be carried out based on simulations software, such as Matlab.

Figure 16A:
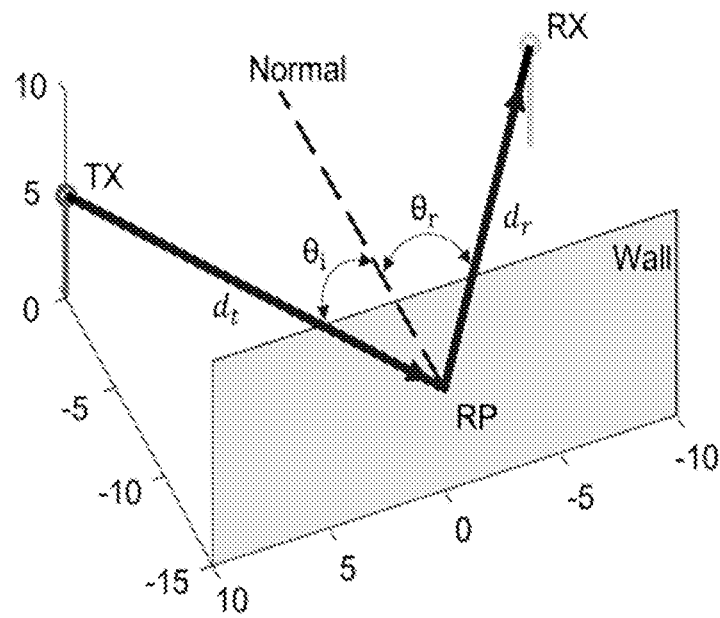
FIG. 16(a), FIG. 16(b), FIG. 16(c) shows Matlab-based simulation steps to get the RL of single- and double-bounce reflection.
Figure 16B:
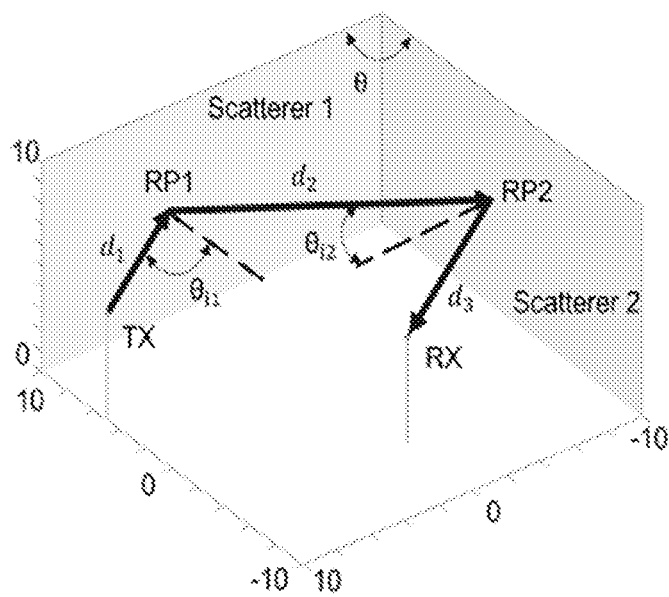
Figure 16C:
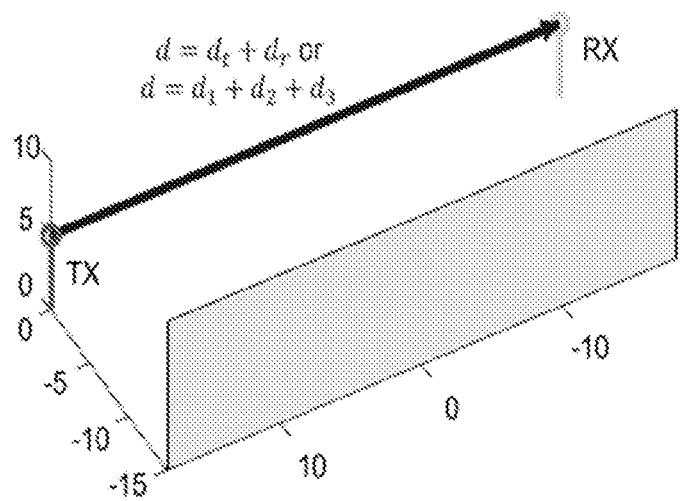

FIG. 16(a), FIG. 16(b), FIG. 16(c) shows Matlab-based simulation steps to get the RL of single- and double-bounce reflection. Step 1 is for reflection. FIG. 16 (a) shows a NLOS single-bounce reflection. FIG. 16(b) shows a NLOS double-bounce reflection.

The simulation configuration is shown in FIG. 16(a), FIG. 16(b), FIG. 16(c), a TX antenna and a RX antenna are placed in an environment with the scatterers. By transmitting a highly directional radio ray from the TX, a single- and a double-bounce reflection trajectory between the TX and the RX can be simulated as shown in FIG. 16(a) and FIG. 16(b), respectively. The vertical walls can be made of one of the three common building materials in indoor environments, namely wood, plasterboard, and glass. The materials are homogeneous and the parameters of the materials in the simulation recommended by ITU are listed in Table I. For single-bounce reflection, a radio ray transmitted by the TX incidents the vertical wall with an incident angle $\theta_i$ as shown in FIG. 16(a), $\theta_i$ is swept from 0° to 80°, by changing the position of the RX. $d_t$ and $d_r$ are the path length between the RP and the TX/RX, respectively. d is the total path length and $d=d_t+d_r$. For double-bounce reflection, a radio ray transmitted by the TX is reflected by two surfaces of the dihedral at incident angles $\theta_{i1}$ and $\theta_{i2}$ as illustrated in FIG. 16(b). According to ray tracing and geometry theory, the angle between two dihedral surfaces $\theta$ is equal to $\theta_{i1}$ plus $\theta_{i2}$. By steering transmitter-side beam direction and changing dihedral angle $\theta$, the combinations of ($\theta_{i1}$, $\theta_{i2}$) with any $\theta_{i1}$ and $\theta_{i2}$ value can be simulated. Let $d_1$, $d_2$, and $d_3$ be the distances between the TX and the RP1, the RP1 and the RP2, and the RP2 and the RX, respectively. Then the total path length d of this double-bounce trajectory is equal to $d=d_1+d_2+d_3$.

TABLE I

Parameters of three common building materials recommended by ITU-R P.2040-1, a, b, c, d are factors for calculating.

| Material | Permittivity | | Conductivity | |
|---|---|---|---|---|
| | a | b | c | d |
| Wood | 1.99 | 0 | 0.0047 | 1.0718 |
| Plasterboard | 2.94 | 0 | 0.0116 | 0.7076 |
| Glass | 6.27 | 0 | 0.0043 | 1.1925 |

To obtain RL data, two-step measurement can be performed. The first step is used to measure the received power reflected by the wall with incident angle $\theta_i$ for single-bounce reflection, or by the two surfaces of a dihedral with incident angles $\theta_{i1}$ and $\theta_{i2}$ of double-bounce reflection. The received power is the average power of transverse electric (TE) polarisation and transverse magnetic (TM) polarisation. The overall path loss (PL) in decibel including RL and free space path loss (FSPL) of the trajectory is calculated as:

$$PL = P_{TX} - P_{RX} \quad (1)$$

where $P_{TX}$ is the transmit power in dBm, $P_{RX}$ is the received power in dBm.

In the second step, the RX is placed at the distance d ($d=d_t+d_r$ for single-bounce reflection or $d=d_1+d_2+d_3$ for double-bounce reflection). The TX transmits exactly the same radio ray as the one in step 1. Therefore, a LOS trajectory between the TX and the RX is established as illustrated in FIG. 16(c). The FSPL at a distance of d can be measured, or can be calculated by Friis' equation:

$$FSPL(f,d) = 32.4 + 20\log_{10}(f) + 20\log_{10}(d) \quad (2)$$

where f is the carrier frequency in mega Hertz and d is path length in kilometer.

Finally, the RL can be calculated by subtracting (2) from (1):

$$RL = PL - FSPL(f,d) \quad (3)$$

It is worth noting that RL takes no account of loss in free space prior or subsequent to the interaction of a wave with the scatterer, RL depends on the interaction between the wave and the scatterer only. Antenna type, antenna gain, transmit power, and path length do not affect RL. A change in these factors brings a corresponding change in RSS. For example, if the $P_{TX}$ increases by 3 dB, the measured RSS increases by 3 dB accordingly. From (1)-(3), the increased transmit power has no impact on PL and RL at all.

Figure 17A:
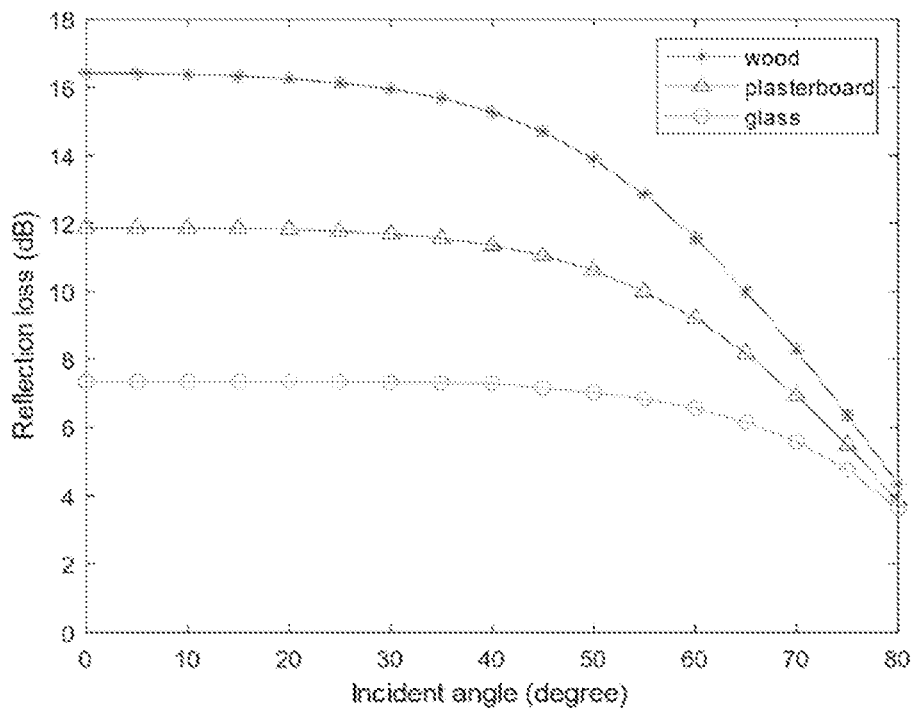
FIG. 17(a), FIG. 17(b) shows simulated RL of single-bounce reflection and simulated $\Sigma$RL of double-bounce reflection at 100 GHz, and the scatterer/scatterers are made of any sequence of wood, plasterboard, and glass.
Figure 17B:
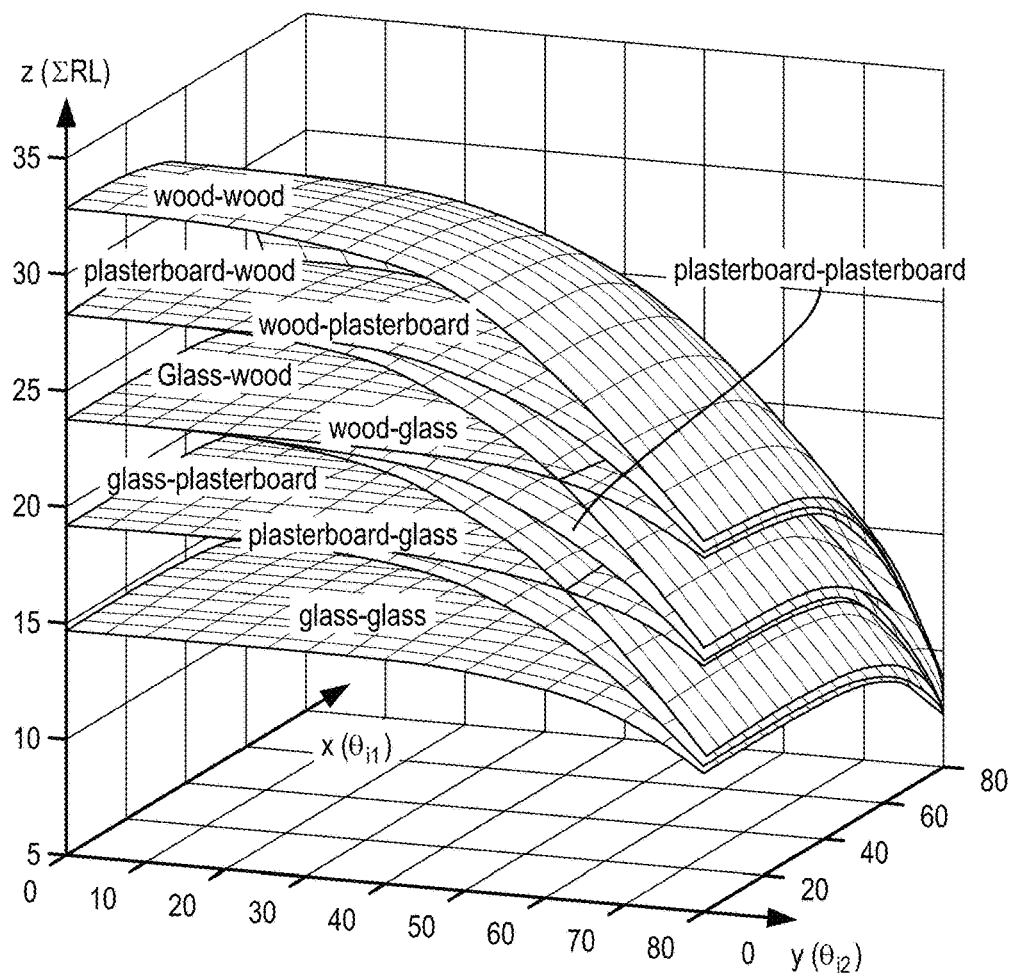

FIG. 17(a), FIG. 17(b) shows simulated RL of single-bounce reflection and simulated $\Sigma$RL of double-bounce reflection at 100 GHz, and the scatterer/scatterers are made of any sequence of wood, plasterboard, and glass.

The RL simulation results of single-bounce reflection induced by scatterers made of wood, plasterboard, and glass at different incident angle $\theta_i$ at 100 GHz are reported in TABLE II and FIG. 17(a). The roughness of wood, plasterboard, and glass in the simulation are 0.4 mm, 0.2 mm, and 0 mm (perfectly smooth), respectively. The roughness represents the root mean square value of the height deviation from a perfectly smooth surface. From FIG. 17 (a), for scatterers made of specific material, RL and incident angle are negatively correlated, large incident angle induces small RL.

TABLE II

RL of single-bounce reflection induced by wood, plasterboard, and glass at 100 GHz

| material | Reflection loss (dB) at different incident angle (°) | | | | | | | | | | | | | | | | |
|---|---|---|---|---|---|---|---|---|---|---|---|---|---|---|---|---|---|
| | 0° | 5° | 10° | 15° | 20° | 25° | 30° | 35° | 40° | 45° | 50° | 55° | 60° | 65° | 70° | 75° | 80° |
| wood | 16.42 | 16.41 | 16.38 | 16.33 | 16.25 | 16.13 | 15.95 | 15.68 | 15.28 | 14.7 | 13.9 | 12.86 | 11.55 | 10.01 | 8.26 | 6.36 | 4.34 |
| plasterboard | 11.86 | 11.86 | 11.85 | 11.84 | 11.81 | 11.76 | 11.68 | 11.55 | 11.35 | 11.05 | 10.61 | 10 | 9.19 | 8.16 | 6.92 | 5.48 | 3.85 |
| glass | 7.34 | 7.34 | 7.34 | 7.34 | 7.34 | 7.33 | 7.31 | 7.3 | 7.29 | 7.15 | 7.02 | 6.83 | 6.56 | 6.15 | 5.58 | 4.76 | 3.63 |

The $\Sigma$RL simulation results of double-bounce RL induced by two scatterers made of any combinations of wood, plasterboard, and glass at incident angles $\theta_{i1}$ and $\theta_{i2}$ at 100 GHz are depicted in FIG. 17 (b). In FIG. 17 (b), x-axis represents the first incident angle $\theta_{i1}$ of a radio ray reflected by the first scatterer, y-axis represents the second incident angle $\theta_{i2}$ of same ray reflected by the second scatterer, z-axis represents the $\Sigma$RL (RL1 plus RL2) induced by the two scatterers. The collection of $\Sigma$RL data of each sequence-of-material is plotted to a surface as shown in FIG. 17 (b). A sequence-of-material, which contains a set of materials, represents the material of scatterers in temporal order when the radio ray strike the scatterers in sequence. The legends in FIG. 17 (b) show all sequences-of-material of double-bounce reflection. For example, the wood-plasterboard surface in FIG. 17 (b) represents the $\Sigma$RL induced by double-bounce reflection, and the first scatterer is made of wood, the second scatterer is made of plasterboard. From FIG. 17 (b), it is evident that the $\Sigma$RL induced by different sequences-of-material are significantly different, especially when both incident angles $\theta_{i1}$ and $\theta_{i2}$ are small. When both incident angles increase, a sharp reduction in $\Sigma$RL is observed. This is expected behavior due to the $\Sigma$RL of double-bounce reflection can be divided into two single-bounce reflections induced by two scatterers respectively, and each single-bounce reflection induces low RL at large incident angle as shown in FIG. 17 (a).

From the RL simulation results, it is worth noting that ΣRL induced by two scatterers is independent of scatterers' sequence-of-material when a radio ray strikes the two scatterers. For example, a ray reflected by a woody surface at incident angle $\theta_{i1}$ of 50° first and then reflected by a glassy surface at incident angle $\theta_{i2}$ of 75° has same ΣRL of 18.66 dB (13.9+4.76=18.66 dB) as same ray reflected by glassy surface at incident angle $\theta_{i1}$ of 75° first and then reflected by woody surface at incident angle $\theta_{i2}$ of 50° (4.76+13.9=18.66 dB). Therefore, by ΣRL of double-bounce reflection, scatterers' material combination may be concluded but sequence-of-material of two scatterers is still uncertain.

As to RL calculation (theoretical analysis), The RL simulation results in FIG. 17(a), FIG. 17(b) can be derived from Fresnel equations as follows.

Figure 18:
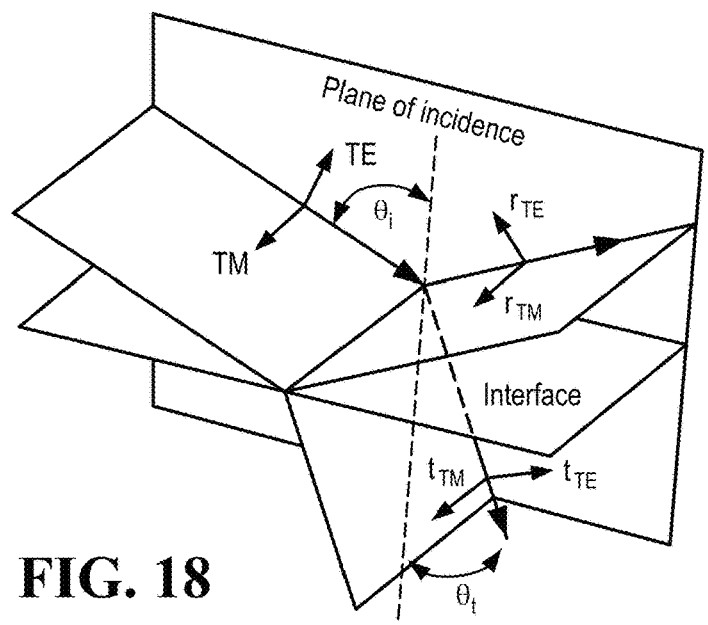
FIG. 18 is a diagram showing reflection and refraction of a wave when a wave strikes a medium with a certain incident angle.

FIG. 18 is a diagram showing reflection and refraction of a wave when a wave strikes a medium with a certain incident angle.

When radio wave strikes an interface from air to a medium, both reflection and refraction of the radio wave may occur as illustrated in FIG. 18.

The Fresnel equations give the ratio of the reflected wave's amplitude to the incident wave's amplitude, for each of two components of polarization (transverse electric (TE) polarisation and transverse magnetic (TM) polarisation) and denoted as $r_{TE}$ and $r_{TM}$, respectively. $r_{TE}$ and $r_{TM}$ can be calculated by using equation (4) to (9):

Real part of the relative permittivity $\eta'$ of material:

$$\eta' = af^b \quad (4)$$

Conductivity σ of material:

$$\sigma = cf^d \quad (5)$$

where f is frequency in GHz and σ is in S/m, value of a,b,c,d of different materials can be obtained from Table I.

Imaginary part of the relative permittivity $\eta''$:

$$\eta'' = 17.98\sigma/f \quad (6)$$

Relative permittivity $\eta$:

$$\eta = \eta' - j\eta'' \quad (7)$$

Reflection coefficient for TE and TM polarization:

$$r_{TE} = \frac{\cos\theta_i - \sqrt{\eta - \sin^2\theta_i}}{\cos\theta_i + \sqrt{\eta - \sin^2\theta_i}} \quad (8)$$

$$r_{TM} = \frac{\eta\cos\theta_i - \sqrt{\eta - \sin^2\theta_i}}{\eta\cos\theta_i + \sqrt{\eta - \sin^2\theta_i}} \quad (9)$$

where $\theta_i$ is the incident angle.

From Fresnel equations (4)-(9), it should be noted that RL is dependent on material of scatterer, radio frequency, and incident angle only, Fresnel equations take no account of free-space losses or other losses prior or subsequent to the interaction of a wave with the interface, but only the effect of the media interface. Antenna type, antenna gain, transmit power, and path length do not contribute to RL at all.

Figure 19A:
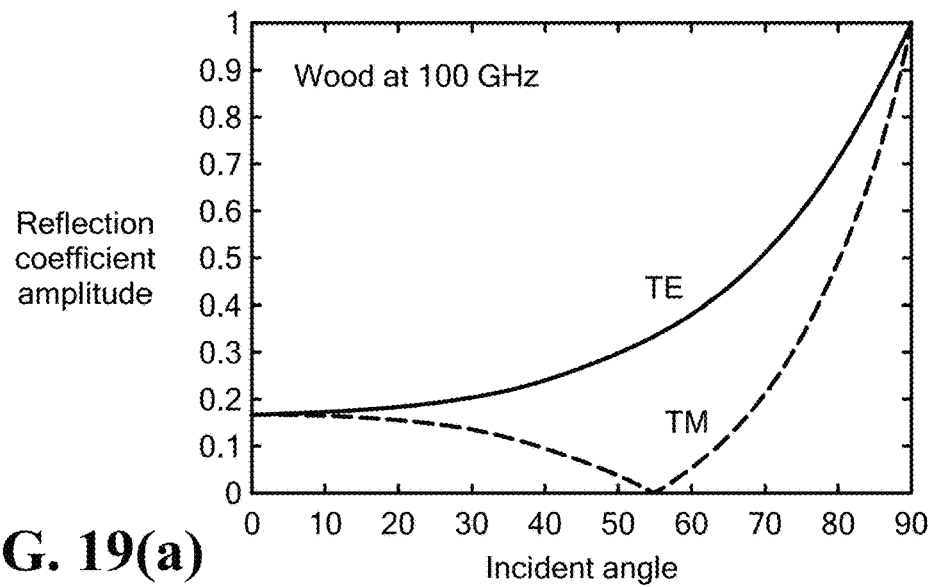
FIG. 19(a), FIG. 19(b), FIG. 19(c) are diagrams showing reflection coefficient amplitudes for air/wood, air/plasterboard, and air/glass interfaces at 100 GHz.
Figure 19B:
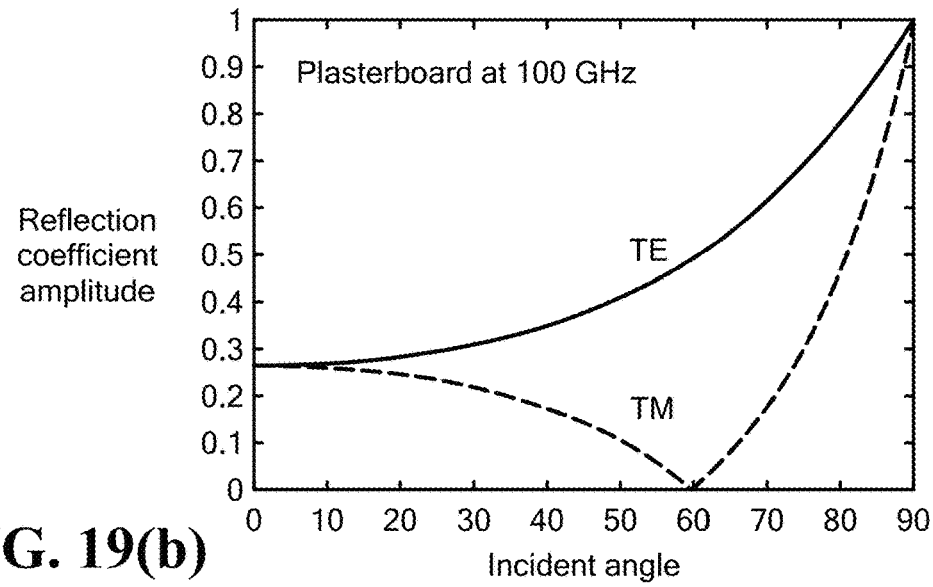
Figure 19C:
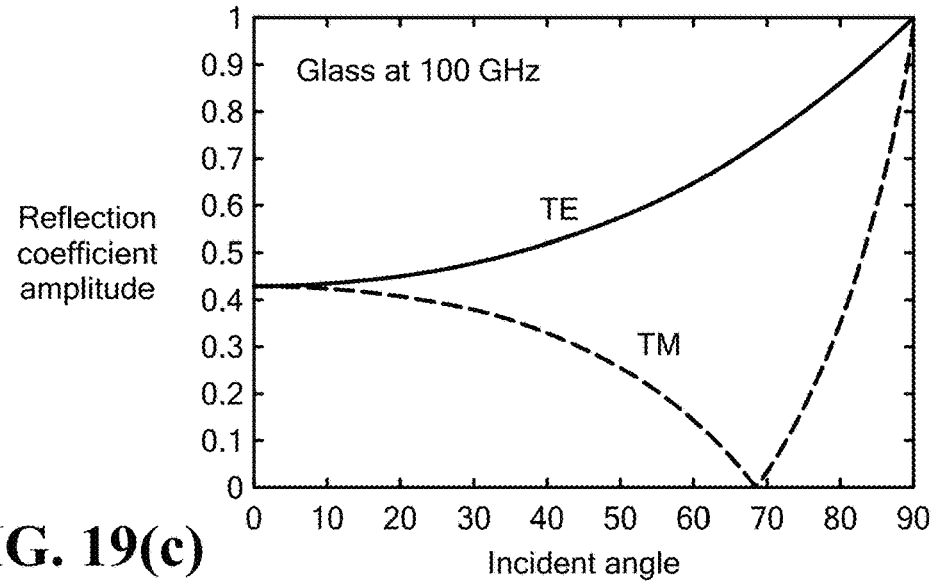

FIG. 19(a), FIG. 19(b), FIG. 19(c) are diagrams showing Reflection coefficient amplitudes for air/wood, air/plasterboard, and air/glass interfaces at 100 GHz.

FIG. 19(a), FIG. 19(b), FIG. 19(c) gives the reflection coefficient amplitudes for a wave at 100 GHz in the air incident upon wood, plasterboard, and glass surfaces over a range of incident angles from 0° to 90° for both TE and TM polarization using equations (4) to (9) and taking the properties of materials in TABLE I.

But in practice it is more interested in formulae that determine reflection coefficient power, since power of radio signals can be directly measured by radio transceivers. The power of a wave is generally proportional to the square of the wave's amplitude. Therefore, Fresnel reflection coefficient power $R_{TE}$ and $R_{TM}$ are the square of $r_{TE}$ and $r_{TM}$.

$$R_{TE} = |r_{TE}|^2 \quad (10)$$

$$R_{TM} = |r_{TM}|^2 \quad (11)$$

For cellular network, the phase of radio wave may shift randomly during propagation, and the antennas are usually cross-polarized. There is an equal amount of power in the TE and TM polarisations. Therefore, in practical applications of cellular network, effective power coefficient $R_{eff}$ is the average of the $R_{TE}$ and $R_{TM}$:

$$R_{eff} = \frac{1}{2}(R_{TE} + R_{TM}) \quad (12)$$

Figure 20A:
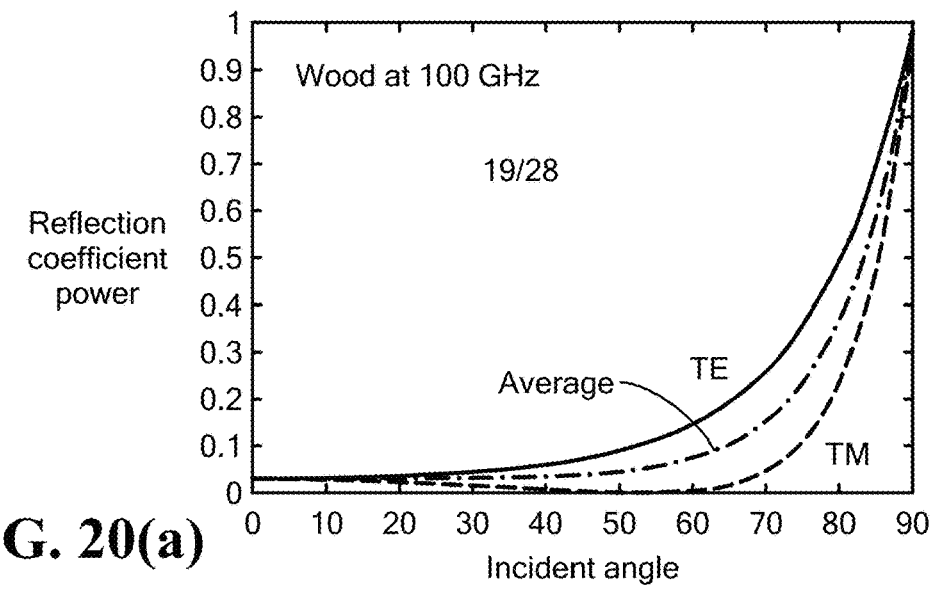
FIG. 20(a), FIG. 20(b), FIG. 20(c) are diagrams showing reflection coefficient power for wood, plasterboard, and glass at 100 GHz.
Figure 20B:
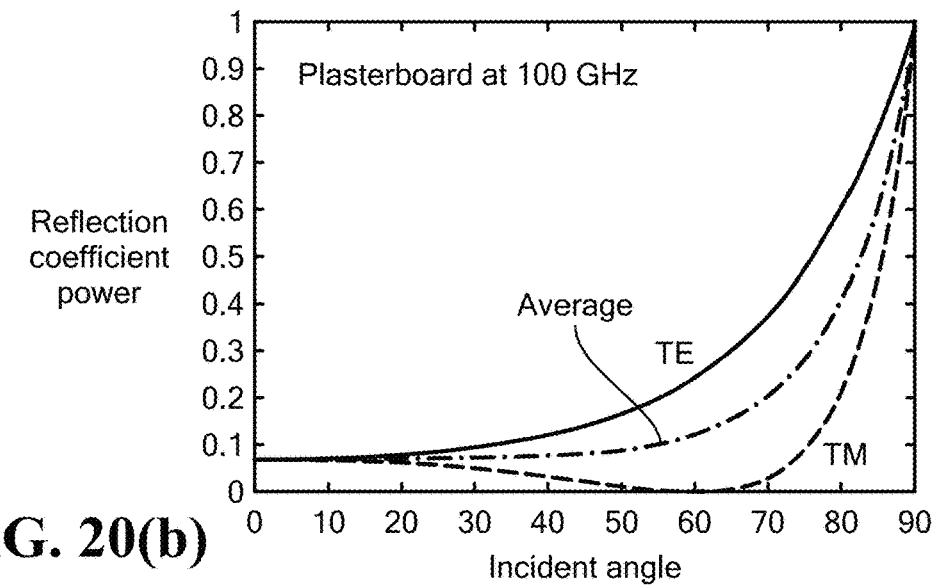
Figure 20C:
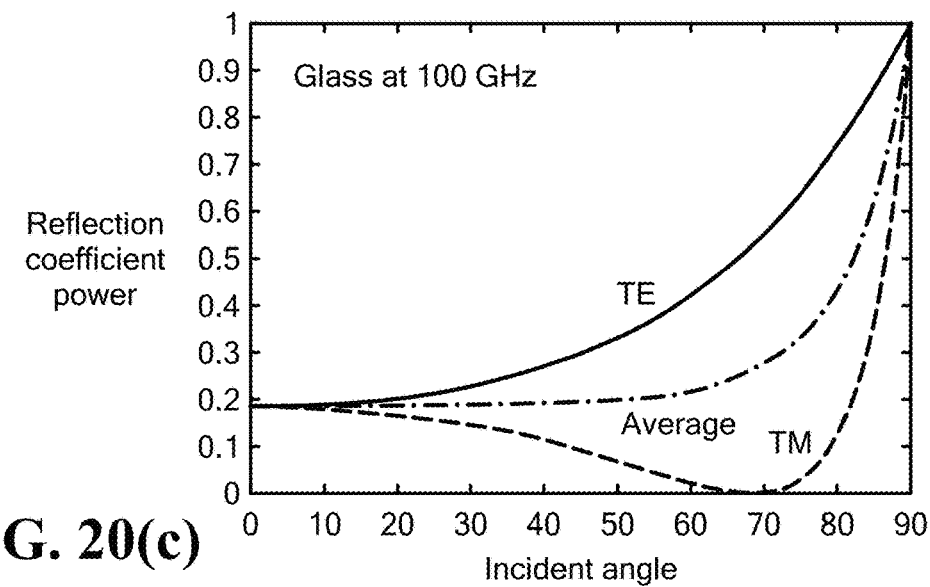

FIG. 20(a), FIG. 20(b), FIG. 20(c) are diagrams showing reflection coefficient power for wood, plasterboard, and glass at 100 GHz.

FIG. 20(a), FIG. 20(b), FIG. 20(c) give the reflection coefficient power for a wave at 100 GHz in the air incident upon wood, plasterboard, and glass surfaces over a range of incident angles from 0° to 90° for both TE and TM polarization using equations (10) to (12) and taking the properties of materials in Table I.

Figure 21A:
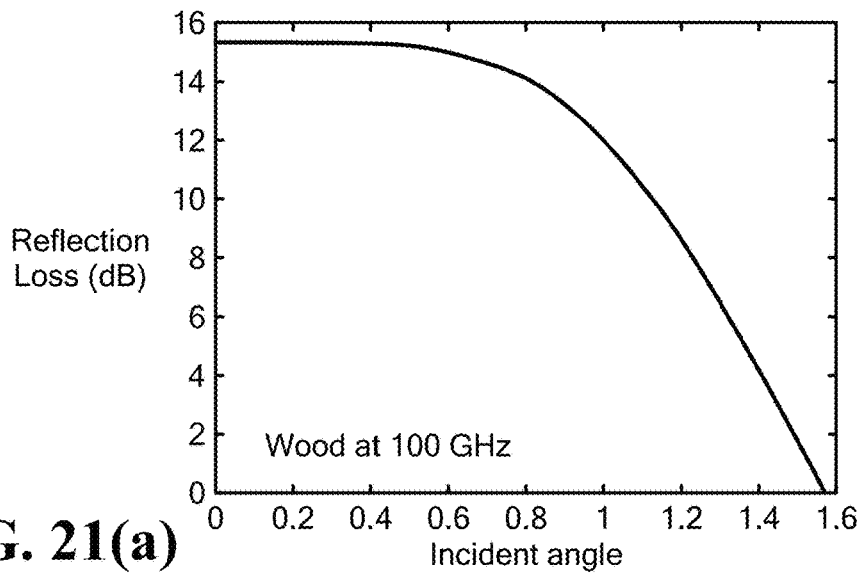
FIG. 21(a), FIG. 21(b), FIG. 21(c) are diagrams showing RLs in decibel for wood, plasterboard, and glass at 100 GHz.
Figure 21B:
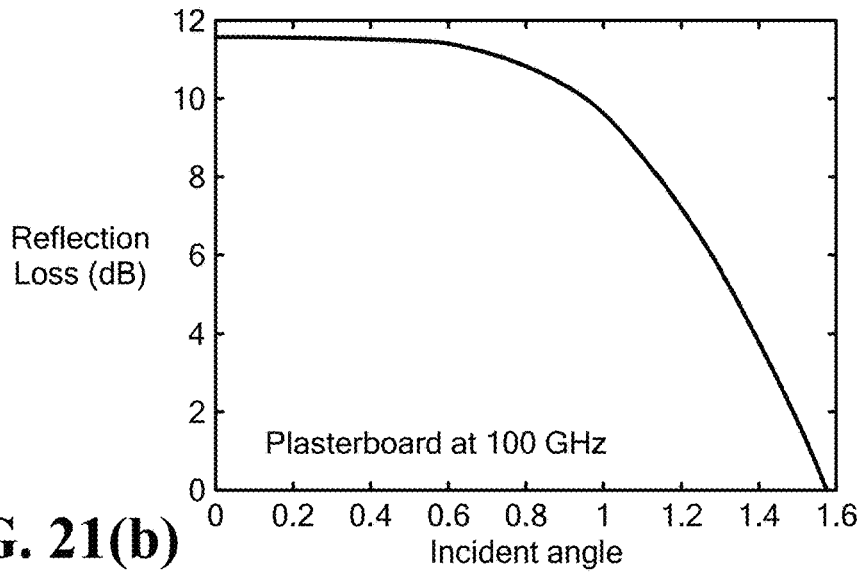
Figure 21C:
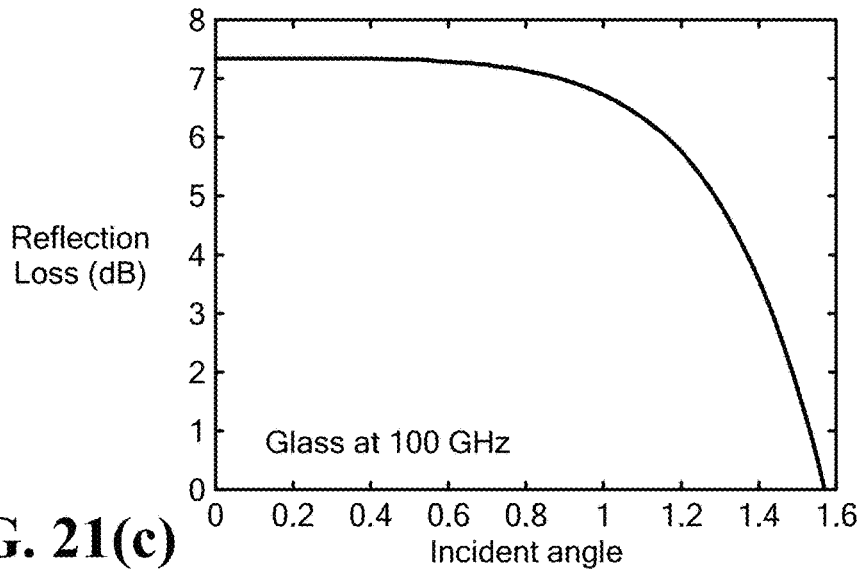

FIG. 21(a), FIG. 21(b), FIG. 21(c) are diagrams showing RLs in decibel for wood, plasterboard, and glass at 100 GHz.

FIG. 21(a), FIG. 21(b), FIG. 21(c) give the theoretical RLs for a wave at 100 GHz in air incident upon wood, plasterboard, and glass surfaces over a range of incident angles from 0° to 90°.

RAT-based scatterer localization and material identification methods will be further described below.

To tackle the challenges of RAT-based scatterer localization and material identification in rich scattering environment, the above two exemplary methods all based on RL will be further detailly described to localize scatterers and identify scatterers' materials simultaneously for NLOS trajectories. These methods do not require any prior knowledge of the environment.

As to a first method, the first method (referred to as "method 1" below) comprises the following detailed steps:

Step 1: calculate RL or ΣRL induced by scatterers under different scenarios at various frequencies to be used for scatterer localization. A specific scenario consists of the following information: the material and incident angle of the n-th scatterer (n=1, 2, . . . , N). The scenario information (materials and incident angles), frequencies, and corresponding RLs are stored in a RL database.

Step 2: establish a NLOS trajectory between TX and RX in an environment to be detected at a certain frequency and measuring the RL or ΣRL for this trajectory by using the measurement method proposed above.

Step 3: identify a set of possible trajectories by matching the overall path length.

Step 4: for the possible trajectories obtained by Step 3, identify the true trajectory by comparing the measured RL or ΣRL at a certain frequency with pre-calculated RL or ΣRL in the RL database created in Step 1.

For the sake of simplicity, it is assumed that all scatterers in an environment are made of the materials listed in Table I only, and the number of bounces of each trajectory is no more than two. Hence, the NLOS trajectories are divided into two categories: single-bounce reflection (N=1) with one RP and double-bounce reflection (N=2) with two RPs. For single-bounce reflection, the scatterer can be made of any of the three materials namely: wood, plasterboard, and glass. For double-bounce reflection, there are three possibilities of material for the first scatterer, three for the second scatterer. Therefore, there are nine possible sequences-of-material of the two scatterers in total. In Step 1, a RL data collecting phase is needed before the utilization of the proposed method. RLs induced by any sequences-of-material at any incident angles are calculated by Fresnel equations, then all the relevant information is stored in a RL database. An example of RL database of single-bounce reflection is shown in Table II. By using the information in Table II, the single-bounce RL induced by any material at any incident angle can be obtained. For multiple-bounce reflection, the ΣRL can be obtained by adding the RL of each reflection together.

Figure 22:
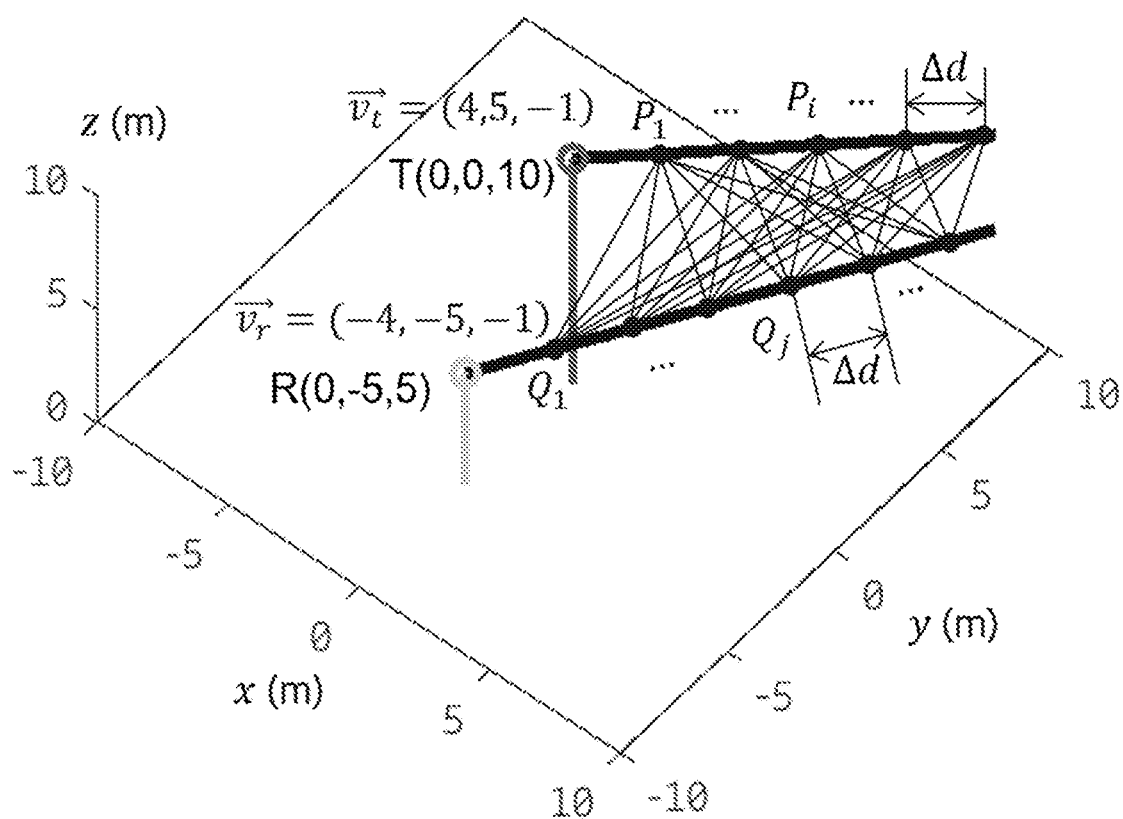
FIG. 22 is a diagram showing an instance to localize the scatterers and identify their materials by a radio ray.

FIG. 22 is a diagram showing an instance to localize the scatterers and identify their materials by a radio ray transmitted from T(0, 0, 10) in the direction of vector (4, 5, −1) and received at R(0, −5, 5) in the direction of vector (−4, −5, −1).

The scenario in FIG. 22 is taken as an example to illustrate the proposed method 1. In step 2, a radio ray transmitted from the TX at T(0, 0, 10) in the direction of $\vec{v}_t=(4, 5, -1)$ is reflected by unknown scatterers (i.e., unknown position, unknown number of reflection bounces, and unknown material of scatterers), and the same ray is received by the RX at R(0, −5, 5) in the direction of $\vec{v}_r=(-4, -5, -1)$. It is assumed that the overall path length is 32.4 m according to TOF measurement, and measured RL or ΣRL is 22.24 dB at 100 GHz by using the measurement method proposed above. The goal is to trace the trajectory, localize the RPs, and identify the material of scatterers for this radio ray.

$\vec{v}_t=(4, 5, -1)$ and $\vec{v}_r=(-4, -5, -1)$ are not coplanar, in other words, the transmitter- and receiver-side beam cannot intersect at a point. Therefore, this radio ray is impossible to be a trajectory with single-bounce reflection.

In Step 3, a set of possible trajectories is firstly determined by matching the overall path length d (d=c·t where c is the speed of light and t is TOF). The aim is to localize a pair-of-RPs lying on this double-bounce reflection trajectory. To achieve this, evenly spaced points are distributed on the transmitter- and receiver-side-beam ray, respectively. As shown in FIG. 22, a collection of points lying on the transmitter-side-beam ray is defined as set P={P1, P2, . . . , Pi, . . . }, the distance between any adjacent points is Δd. The selection of Δd needs to carefully balance localization accuracy and computational complexity, a shorter Δd can improve localization accuracy but leads to a relatively long latency and high computational complexity. The coordinate of any point in set P can be obtained by the coordinate of initial point (0, 0, 10), Δd, the transmitter-side beam direction $\vec{v}_t$, and index i. Similarly, it is defined with a set Q={Q1, Q2, . . . , Qj, . . . } for receiver-side-beam ray. Then a path-length-matching algorithm is used to identify all possible pairs-of-RPs and all possible trajectories. The algorithm consists of the following procedure:

For any point Pi in set P and any point Qj in set Q, the overall double-bounce reflection path length d(Pi,Qj) is calculated. The d(Pi,Qj) is the sum of the lengths of the three line segments T-Pi, Pi-Qj, and Qj-R. In case of d(Pi,Qj) ≠c·TOF, this (Pi,Qj) is ignored. This procedure is repeated until d(Pi,Qj) is longer than or equal to the overall path length of 32.4 m. Finally, four pairs-of-RPs are obtained after the algorithm enumerates all combinations of Pi and Qj:

Pair A: RP1(8, 10, 8), RP2(10, 7.5, 7.5)

Pair B: RP1(8.6, 10.75, 7.85), RP2(6, 2.5, 6.5)

Pair C: RP1(5.8, 7.25, 8.55), RP2(10.9, 8.62, 7.73)

Pair D: RP1(0.8, 1, 9.8), RP2(11.1, 8.88, 7.78).

The four trajectories A-D with double-bounce reflection induced by scatterers at pairs-of-RPs A-D are depicted in FIG. 10(a)-(d), the corresponding incident angles at each RP can be obtained by (13) and depicted in FIG. 10(a)-(d) also.

$$\theta = \frac{1}{2}\arccos\left(\frac{u \cdot v}{\|u\|\|v\|}\right) \quad (13)$$

where u and v are the two Euclidean vectors initialed from RP and along with incident ray and outgoing ray, respectively.

In Step 4, the true pair-of-RPs is identified by comparing the measured ΣRL with the data in the RL database created in Step 1. RL induced by the first scatterer (RL1) at incident angle $\theta_{i1}$, RL induced by the second scatterer (RL2) at incident angle $\theta_{i2}$ of trajectories A-D are summarized in Table III. From the ΣRL data in Table III, it is evident that there are significant differences between the most of RLs of trajectories A-D with different sequences-of-material. A RL value of 22.24 dB has already been measured at 100 GHz in Step 2. By looking up Table III, a row with ΣRL=22.24 dB is found. From the information contained in this row, it can be concluded that trajectory A is the true trajectory, RP1 locates at (8, 10, 8) and the first scatterer is made of wood, RP2 locates at (10, 7.5, 7.5) and the second scatterer is made of glass. The information of the two RPs can be used to represent two data points in 3D space with 4-dimensional information including Cartesian coordinate (x, y, z) and material information. By collecting enough data points in the environment and converting the point cloud to 3D surface, a 3D digital map with material information can be generated.

TABLE III

All possible trajectories, and their RP coordinates, incident angles $\theta_{i1}$ and $\theta_{i2}$, all possible sequences-of-material, RL1 induced by scatterer1, RL2 induce by scatterer2, and ΣRL (RL1 plus RL2) in case of a radio ray transmitted from TX(0, 0, 10) in the direction of vector (4, 5, −1) and received at RX(0, −5, 5) in the direction of vector (−4, −5, −1) and the overall path length is 32.4 m

| Trajectory | RP1 | RP2 | $\theta_{i1}$ | $\theta_{i2}$ | Scatterer1 | Scatterer2 | RL1 (dB) | RL2 (dB) | ΣRLi (i = 1, 2, . . . 36) |
|---|---|---|---|---|---|---|---|---|---|
| A | (8, 10, 8) | (10, 7.5, 7.5) | 39.5° | 59.1° | wood | wood | 15.28 | 13.52 | 28.8 |
| | | | | | plasterboard | plasterboard | 11.35 | 10.38 | 21.73 |
| | | | | | glass | glass | 7.29 | 6.96 | 14.25 |
| | | | | | wood | plasterboard | 15.28 | 10.38 | 25.66 |
| | | | | | plasterboard | wood | 11.35 | 13.52 | 24.87 |
| | | | | | wood | Glass | 15.28 | 6.96 | 22.24 |
| | | | | | glass | wood | 7.29 | 13.52 | 20.81 |
| | | | | | plasterboard | glass | 11.35 | 6.96 | 18.31 |
| | | | | | glass | plasterboard | 7.29 | 10.38 | 17.67 |
| B | (8.6, 10.75, 7.85) | (6, 2.5, 6.5) | 13.8° | 79.6° | wood | wood | 16.34 | 4.34 | 20.68 |
| | | | | | plasterboard | plasterboard | 11.84 | 3.85 | 15.69 |
| | | | | | glass | glass | 7.34 | 3.63 | 10.97 |
| | | | | | wood | plasterboard | 16.34 | 3.85 | 20.19 |
| | | | | | plasterboard | wood | 11.84 | 4.34 | 16.18 |
| | | | | | wood | Glass | 16.34 | 3.63 | 19.97 |
| | | | | | glass | wood | 7.34 | 4.34 | 11.68 |
| | | | | | plasterboard | glass | 11.84 | 3.63 | 15.47 |
| | | | | | glass | plasterboard | 7.34 | 3.85 | 11.19 |
| C | (5.8, 7.25, 8.55) | (10.9, 8.62, 7.73) | 72.1° | 20.1° | wood | wood | 7.52 | 16.25 | 23.77 |
| | | | | | plasterboard | plasterboard | 6.37 | 11.81 | 18.18 |
| | | | | | glass | glass | 5.28 | 7.34 | 12.62 |
| | | | | | wood | plasterboard | 7.52 | 11.81 | 19.33 |
| | | | | | plasterboard | wood | 6.37 | 16.25 | 22.62 |
| | | | | | wood | Glass | 7.52 | 7.34 | 14.86 |
| | | | | | glass | wood | 5.28 | 16.25 | 21.53 |
| | | | | | plasterboard | glass | 6.37 | 7.34 | 13.71 |
| | | | | | glass | plasterboard | 5.28 | 11.81 | 17.09 |
| D | (0.8, 1, 9.8) | (11.1, 8.88, 7.78) | 83.1° | 11.3° | wood | wood | 3.08 | 16.37 | 19.45 |
| | | | | | plasterboard | plasterboard | 2.78 | 11.85 | 14.63 |
| | | | | | glass | glass | 2.76 | 7.34 | 10.1 |
| | | | | | wood | plasterboard | 3.08 | 11.85 | 14.93 |
| | | | | | plasterboard | wood | 2.78 | 16.37 | 19.15 |
| | | | | | wood | Glass | 3.08 | 7.34 | 10.42 |
| | | | | | glass | wood | 2.76 | 16.37 | 19.13 |
| | | | | | plasterboard | glass | 2.78 | 7.34 | 10.12 |
| | | | | | glass | plasterboard | 2.76 | 11.85 | 14.61 |

Figure 23:
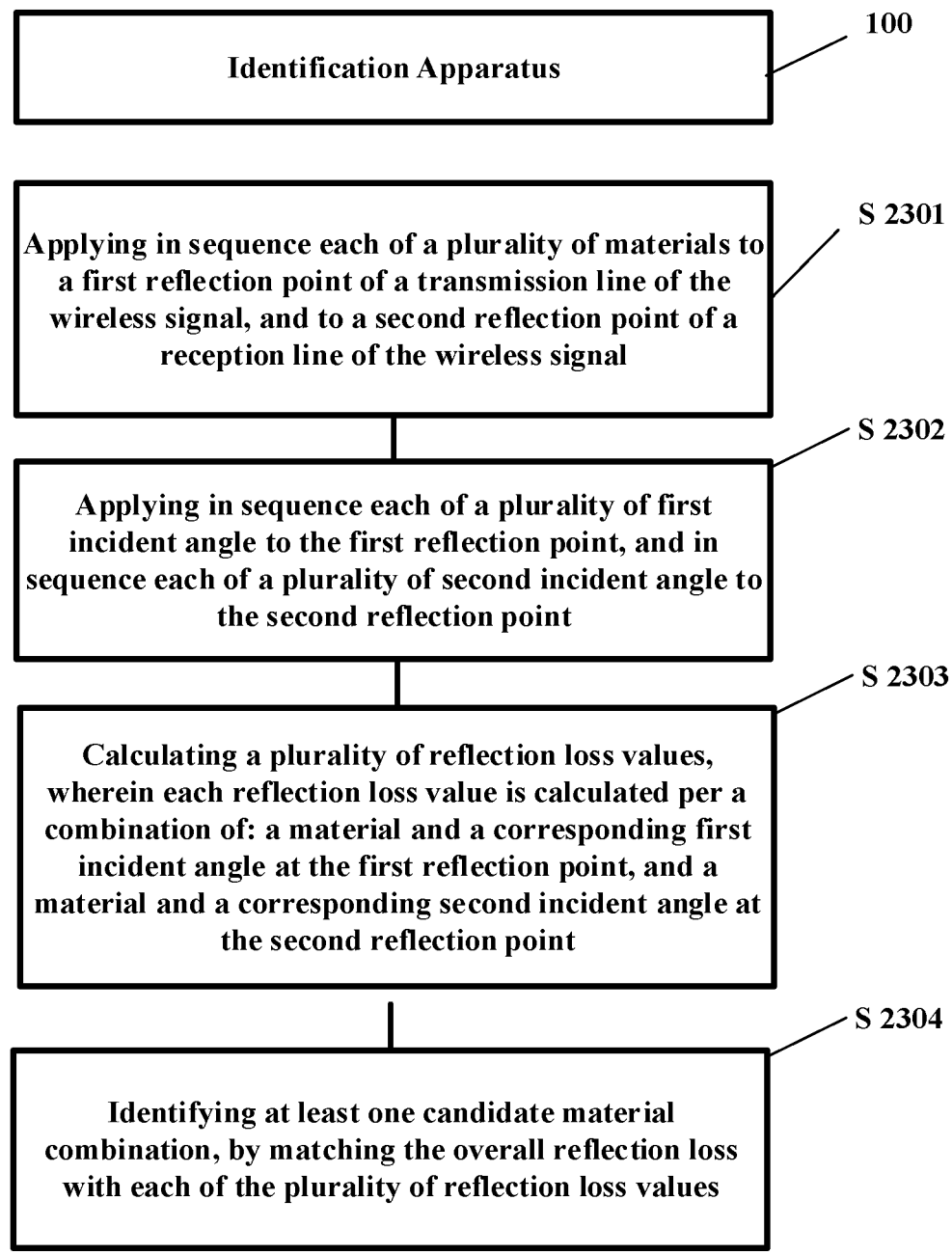
FIG. 23 is an exemplary flow chart showing further substeps of a second method, according to embodiments of the present disclosure.

FIG. 23 is an exemplary flow chart showing further substeps of a second method, according to embodiments of the present disclosure.

In embodiments of the present disclosure, step S1103, determining at least one candidate material combination comprises: step 2301, applying in sequence each of a plurality of materials to a first reflection point of a transmission line of the wireless signal, and to a second reflection point of a reception line of the wireless signal; step 2302, applying in sequence each of a plurality of first incident angle to the first reflection point, and in sequence each of a plurality of second incident angle to the second reflection point; step 2303, calculating a plurality of reflection loss values, wherein each reflection loss value is calculated per a combination of: a material and a corresponding first incident angle at the first reflection point, and a material and a corresponding second incident angle at the second reflection point; step 2304, identifying at least one candidate material combination, by matching the overall reflection loss with each of the plurality of reflection loss values. A material combination comprises a material as well as a corresponding first incident angle at the first reflection point, and a material as well as a corresponding second incident angle at the second reflection point.

According to embodiments of the present disclosure, as for method 2, step S1103 may be performed at first.

Figure 24:
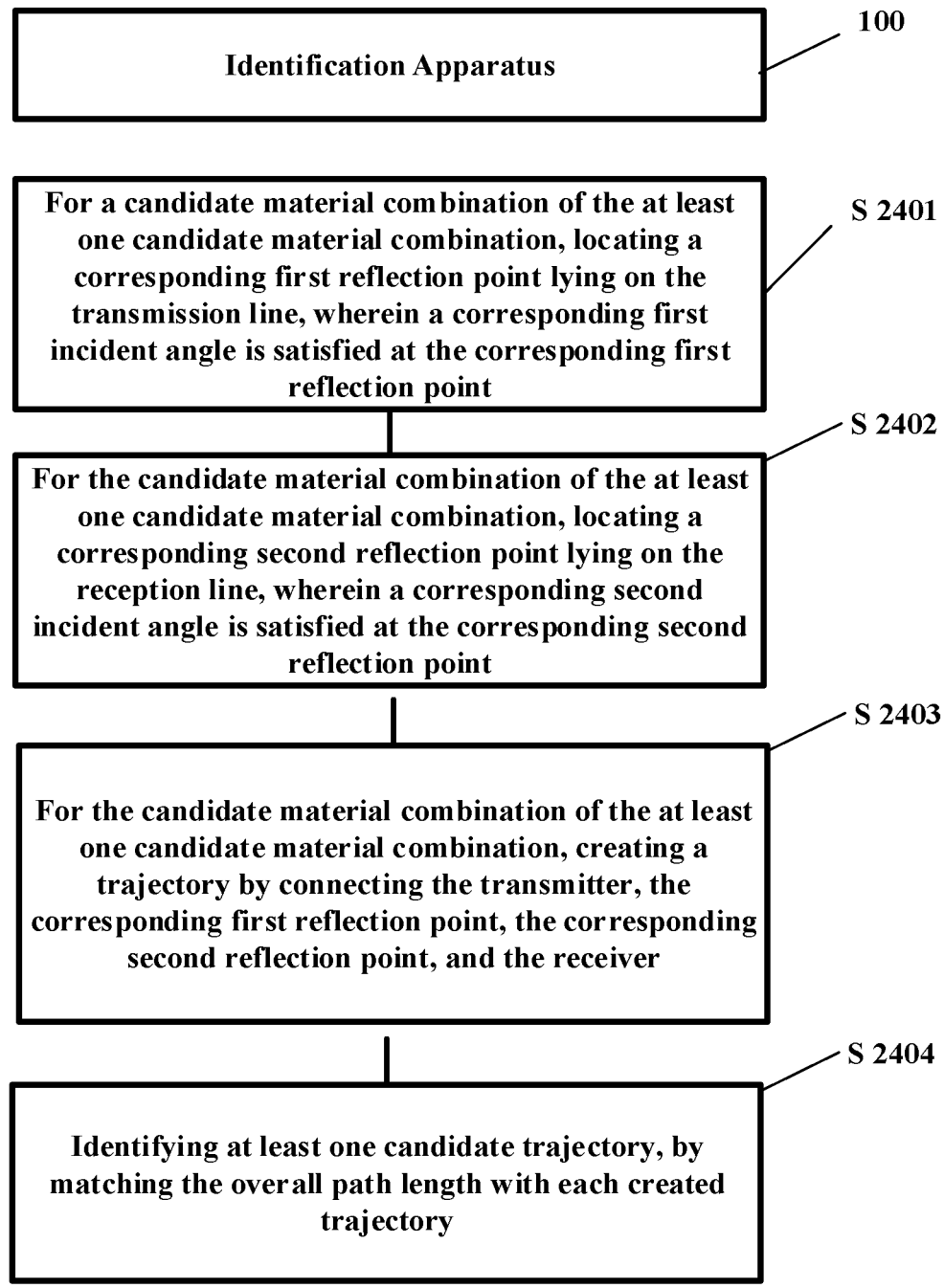
FIG. 24 is an exemplary flow chart showing further substeps of a second method, according to embodiments of the present disclosure.

FIG. 24 is an exemplary flow chart showing further substeps of a second method, according to embodiments of the present disclosure.

In embodiments of the present disclosure, step S1104, determining at least one candidate trajectory of the wireless signal between the transmitter and the receiver comprises: step S2401, for a candidate material combination of the at least one candidate material combination, locating a corresponding first reflection point lying on the transmission line, wherein a corresponding first incident angle is satisfied at the corresponding first reflection point; step S2402, for the candidate material combination of the at least one candidate material combination, locating a corresponding second reflection point lying on the reception line, wherein a corresponding second incident angle is satisfied at the corresponding second reflection point; step S2403, for the candidate material combination of the at least one candidate material combination, creating a trajectory by connecting the transmitter, the corresponding first reflection point, the corresponding second reflection point, and the receiver; step S2404, identifying at least one candidate trajectory, by matching the overall path length with each created trajectory.

According to embodiments of the present disclosure, as for method 2, step S1102 may be performed later.

Detailly, as the second method, an alternative method (referred to as method 2 below) for scatterer localization and material identification can be developed by executing step 3 and 4 of method 1 in reverse order. Similar to method 1, method 2 carries out a four-step procedure.

Step 1 and 2: essentially the same as method 1.

Step 23: find all sequences-of-material and incident angles from the RL database such that the RL induced by scatterers with these sequences-of-material and incident angles is close to measured RL.

Step 24: estimate the positions of RPs of every possible trajectory by matching the overall path length.

Step 1 and 2 of method 2 just do the same as the steps of method 1, namely to create a RL database and then measure the RL of a trajectory in the environment to be detected. In step 23, RL matching is performed, in other words, each RL in the RL database is compared with the measured RL and the rows with same RL as measured RL are identified. The purpose of RL matching is to find all possible sequences-of-material and incident angles that induce same RL as measured RL. To help visualize the possible sequences-of-material and their incident angles, the trace of the RL data surfaces in FIG. 17(b) is plotted. The trace of a surface is the cross section of the surface with a plane parallel to one of the coordinate planes. For example, it is assumed that the measured RL is 25.66 dB in the scenario depicted in FIG. 22.

Figure 25A:
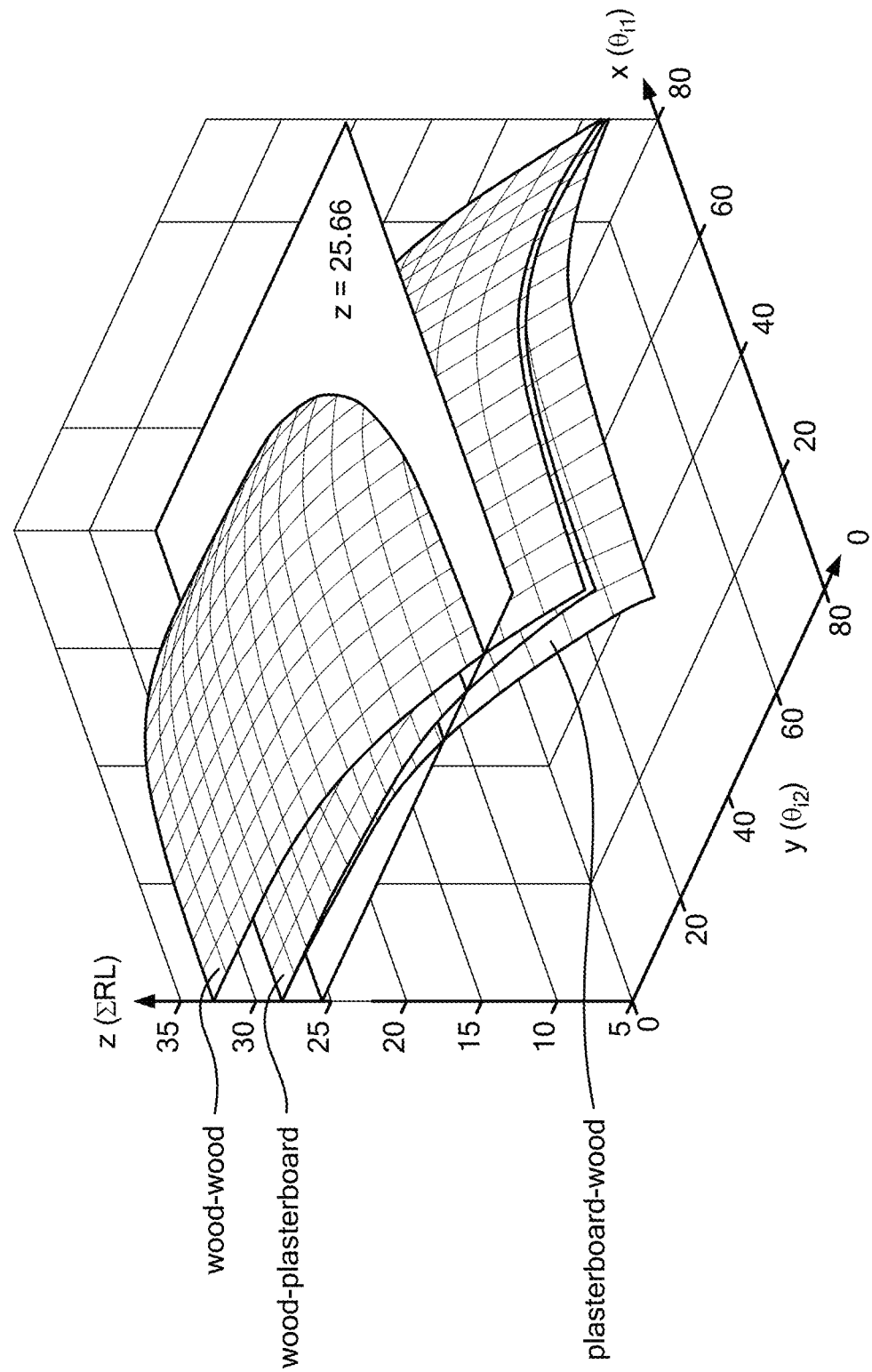
FIG. 25(a), FIG. 25(b) are diagrams showing how to obtain all possible sequences-of-material and incident angles.
Figure 25B:
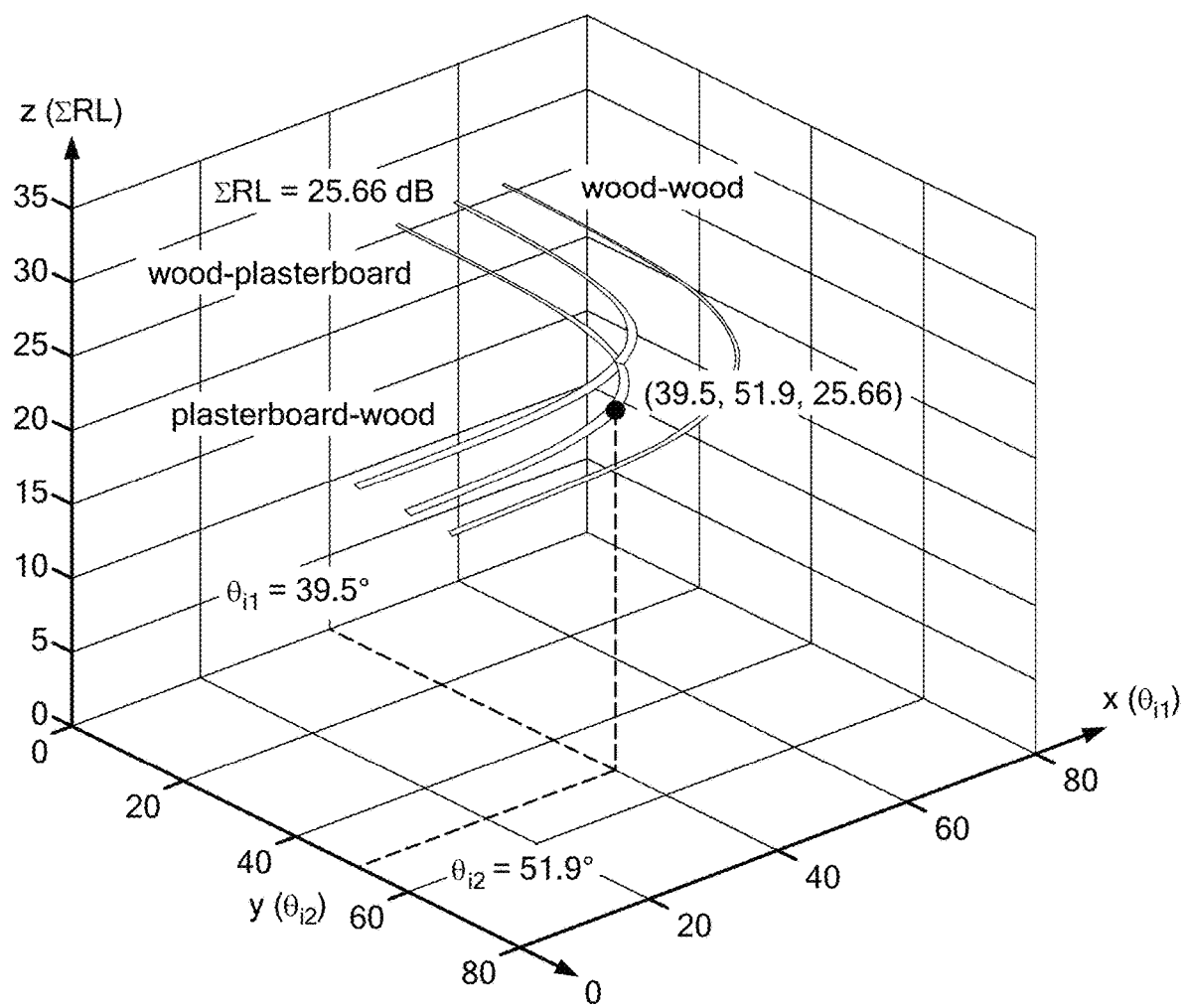

FIG. 25(a), FIG. 25(b) are diagrams showing how to obtain all possible sequences-of-material and incident angles.

By intersecting plane z=25.66 with RL data surfaces, all possible sequences-of-material and incident angles that induce RL of 25.66 dB can be obtained.

As shown in FIG. 25(a), by intersecting plane z=25.66 with the double-bounce RL data surfaces, three traces can be found. It should be noted that, in that step, other RL values may cause other numbers of the traces, either less or more than three.

Removing the RL data surfaces helps to visualize the three traces and they are illustrated in FIG. 25(b). These three traces consist of all sequences-of-material and incident angles information about trajectories that can induce RL of 25.66 dB. For example, in FIG. 25(b), point (39.5, 51.9, 25.66) lying on the trace curve wood-plasterboard indicates that a double-bounce-reflection trajectory may contain the following propagation properties: (1) the first reflection is induced by a scatterer made of wood at incident angle $\theta_{i1}$=39.5°; (2) the second reflection is induced by a scatterer made of plasterboard at incident angle $\theta_{i2}$=51.9°; (3) the ΣRL of this trajectory is 25.66 dB. By Step 23, all possible sequences-of-material and incident angles of double-bounce reflection with RL of 25.66 dB can be found.

In Step 24, the incident angles of all possible trajectories are firstly calculated using AOD, AOA, and coordinates of TX and RX. Similar to Step 3 of method 1, as shown in FIG. 22, for any point Pi in set P and any point Qj in set Q, joining T(0, 0, 10), Pi, Qj, and R(0, −5, 5) in sequence can trace a trajectory. The first incident angle $\theta_{i1}$ and the second incident angle $\theta_{i2}$ of this trajectory can be obtained by using (13).

Figure 26:
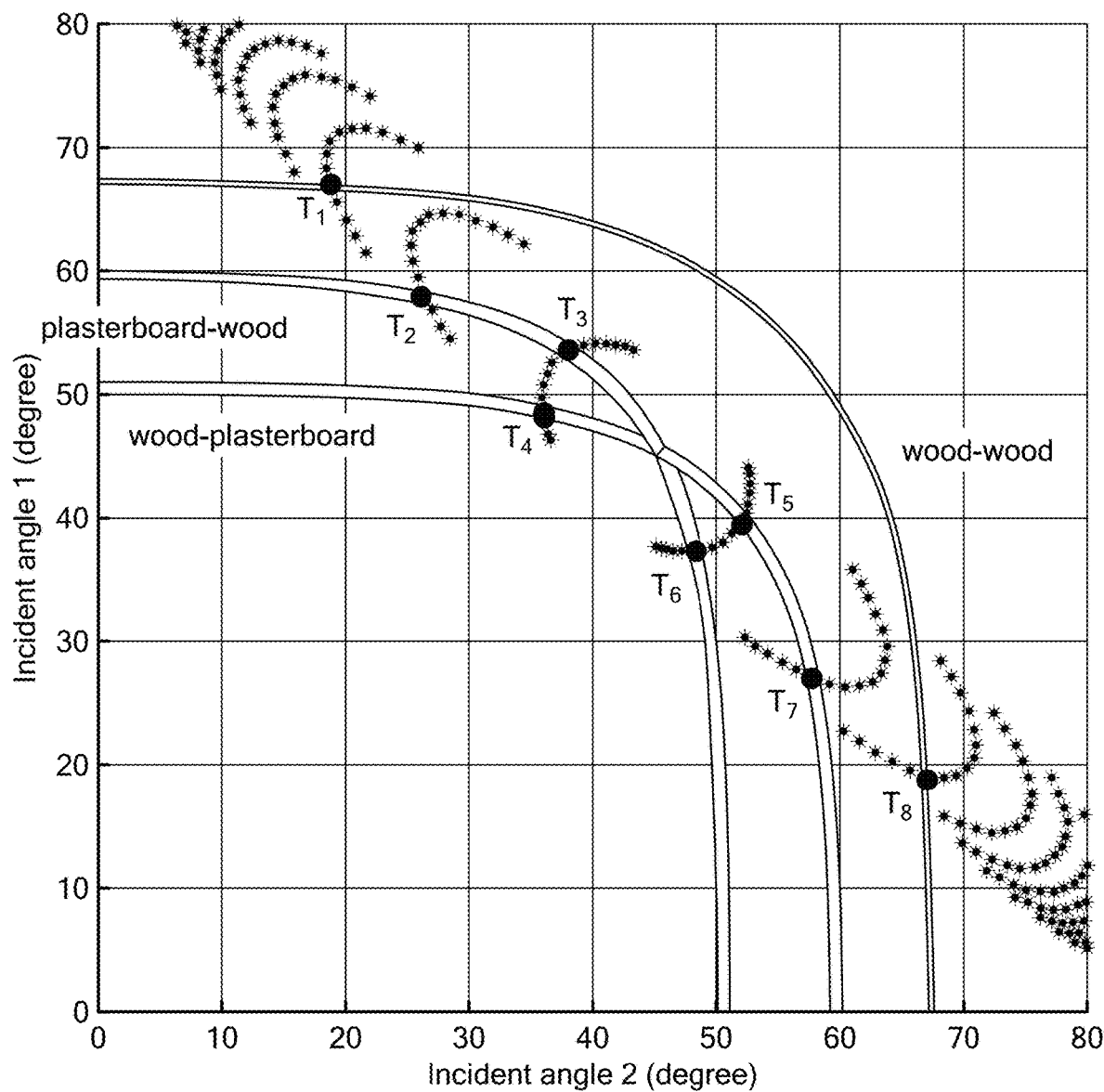
FIG. 26 is a diagram showing how the true trajectory is identified by Step 24 of method 2.

FIG. 26 is a diagram showing how the true trajectory is identified by Step 24 of method 2.

In FIG. 26, the incident angles $\theta_{i1}$ and $\theta_{i2}$ of every possible trajectory are shown by enumerating all combinations of Pi and Qj until the trajectory length is longer than 32.4 m. The incident angles of each trajectory are marked by a star (*), the y- and x-coordinate of a star marker represents the first incident angle $\theta_{i1}$ and the second incident angle $\theta_{i2}$ of a trajectory, respectively. If the three traces in FIG. 25(b) are combined into FIG. 26, the traces intersect the star markers at several points T1, T2, . . . , T8. These points represent eight trajectories 1-8 that satisfy the following conditions: (1) the RPs induce ΣRL of 25.66 dB; (2) the RPs lie on the transmitter- and the receiver-side beam ray, respectively. Table IV summarizes the coordinates of RPs, incident angles, and sequence-of-material of trajectories 1-8. The overall path length of trajectories 1-8 are also calculated by coordinates of RPs. Finally, by comparing the path length of trajectories 1-8 with the measured path length of 32.4 m, it can be concluded that trajectory 5 is the true trajectory.

TABLE IV

All possible trajectories, and their RP coordinates, incident angles $\theta_{i1}$ and $\theta_{i2}$, all possible sequences-of-material, and overall path length in case of a radio ray transmitted from TX(0, 0, 10) in the direction of vector (4, 5, −1) and received at RX(0, −5, 5) in the direction of vector (−4, −5, −1) and the scatterers induce RL of 25.66 dB

| Trajectory | RP1 | RP2 | $\theta_{i1}$ | $\theta_{i2}$ | Scatterer1 | Scatterer2 | Path length (m) |
|---|---|---|---|---|---|---|---|
| 1 | (11, 13.75, 7.25) | (16, 15, 9) | 67° | 18.7° | Wood | wood | 49.2 |
| 2 | (13, 16.25, 6.75) | (17, 16.25, 9.25) | 58.1° | 26.4° | Plasterboard | Wood | 53.3 |
| 3 | (7, 8.75, 8.25) | (10, 7.5, 7.5) | 53.7° | 38.3° | Plasterboard | Wood | 30.9 |
| 4 | (14, 17.5, 6.5) | (17, 16.25, 9.25) | 48.1° | 36° | Wood | Plasterboard | 54.5 |
| 5 | (8, 10, 8) | (10, 7.5, 7.5) | 39.5° | 51.9° | Wood | Plasterboard | 32.4 |
| 6 | (12, 15, 7) | (14, 12.5, 8.5) | 37.4° | 48.8° | Plasterboard | Wood | 45.7 |
| 7 | (14, 17.5, 6.5) | (15, 13.75, 8.75) | 27.1° | 57.7° | Wood | Plasterboard | 51.5 |
| 8 | (13, 16.25, 6.75) | (13, 11.25, 8.25) | 19.2° | 67° | wood | Wood | 47.3 |

It should be understood that the one or two scatters are just examples without any limitation to the present disclosure. The methods illustrated with such embodiments can be also applied to more than two scatters.

A performance of the methods herein may be further analysed as follows.

The proposed methods localize scatterers by RL which is obtained by measured RSS. Therefore, their performance is highly affected by accuracy of RSS measurement (RSS uncertainty). RSS uncertainty is influenced by some deterministic and stochastic factors. The deterministic factors can be predicted and estimated, such as antenna patterns and measurement instruments' resolution. For example, by using high performance equipment (e.g., massive multiple-input multiple-output (MIMO) antennas) and measurement instruments with highly accurate power resolution, the RSS measurement error can be minimized. Unlike deterministic factors, stochastic factors are time-varying and hard to be estimated before measurement, RSS uncertainty induced by stochastic factors may result from non-ideal equipment, hardware impairment, Gaussian random noise, and interference from neighboring antennas in a JCAS network. To eliminate RSS uncertainty caused by stochastic factors, multiple RSS measurements can be performed, then calculate the mean RSS and subsequently estimate the RL to be used in the proposed methods. With the help of multiple measurements, a relatively long measurement period can achieve better SNR and lower standard error of RSS uncertainty than RSS uncertainty by single measurement. Simulation shows that the standard error of Gaussian random noise with 0 dB mean and 0.5 dB standard deviation decreased to 0.05 dB when 50 measurements have been carried out. The RSS-Measurement-Muting (RMM) can be used to mitigate interference from the environment for RSS measurement also. RMM delays or avoids the transmission of any messages of neighboring nodes for a time period when a RSS measurement is performed by a JCAS node.

It is expected that really high accuracy of RSS measurement will be achieved in 6G. In particular, RSS-based JCAS applications have a definite need for accurate measurement to sense and identify objects. Higher accuracy of measurement can improve the performance of the proposed methods. For example, it is assumed that the measured RL is 12.7 dB in the scenario illustrated in FIG. 22, and the RSS uncertainty of the JCAS scatterer localization system is 1.5 dB. In other words, the true RL of this trajectory ranges from 11.2 to 14.2 dB (12.7∓1.5 dB). By looking up the RL data in Table III, three RLs (11.68 dB, 12.62 dB, and 13.71 dB) are within the range. Therefore, it can be concluded that the coordinates and materials of the two scatterers could be one of the below cases:

glass at (8.6, 10.75, 7.85), wood at (6, 2.5, 6.5);
glass at (5.8, 7.25, 8.55), glass at (10.9, 8.62, 7.73);
plasterboard at (5.8, 7.25, 8.55), glass at (10.9, 8.62, 7.73).

By taking advantage of the 6G technologies, it can be assumed that the performance of measurement can be improved, e.g., RSS uncertainty can be reduced to 1 dB. Now the true RL in previous example ranges from 11.7 to 13.7 dB (12.7±1 dB). It can be immediately identified that the first scatterer is made of glass and locates at (5.8, 7.25, 8.55), the second scatterer is made of glass also and locates at (10.9, 8.62, 7.73). Because only one RL of 12.62 dB in Table III is within the range of 12.7±1 dB.

Embodiments of the present disclosure includes among others:

A framework where a bi-static setup with a transmitter and receiver is employed for Material sensing.

Scatter localization procedure which exploits the TOF information together with the reflection loss.

Scatterer material type identification procedure by matching the reflection loss, TOF and the geometry of transmitter and receiver node.

According to embodiments of the present disclosure, scatterer's material identification and localization method for multiple-bounce reflection in rich scattering environment may be proposed.

By matching the overall path length proposed in a first method, the number of bounces and sequence-of-material can be identified.

By matching the measured RL proposed in a second method, all possible sequences-of-material and incident angles that induce the measured RL can be found.

The proposed method can be implemented in rich scattering environment, so as to overcome the drawbacks of conventional methods based on single-bounce-assumption.

The proposed method can localize scatterers and identify scatterers' material simultaneously. There are no similar solutions so far.

The proposed methods will be able to support passive localization in a cost-effective manner by eliminating the need for dedicated hardware (e.g., sensor) and external assistance (e.g., 3D digital map database) by using only cellular infrastructure.

Figure 27:
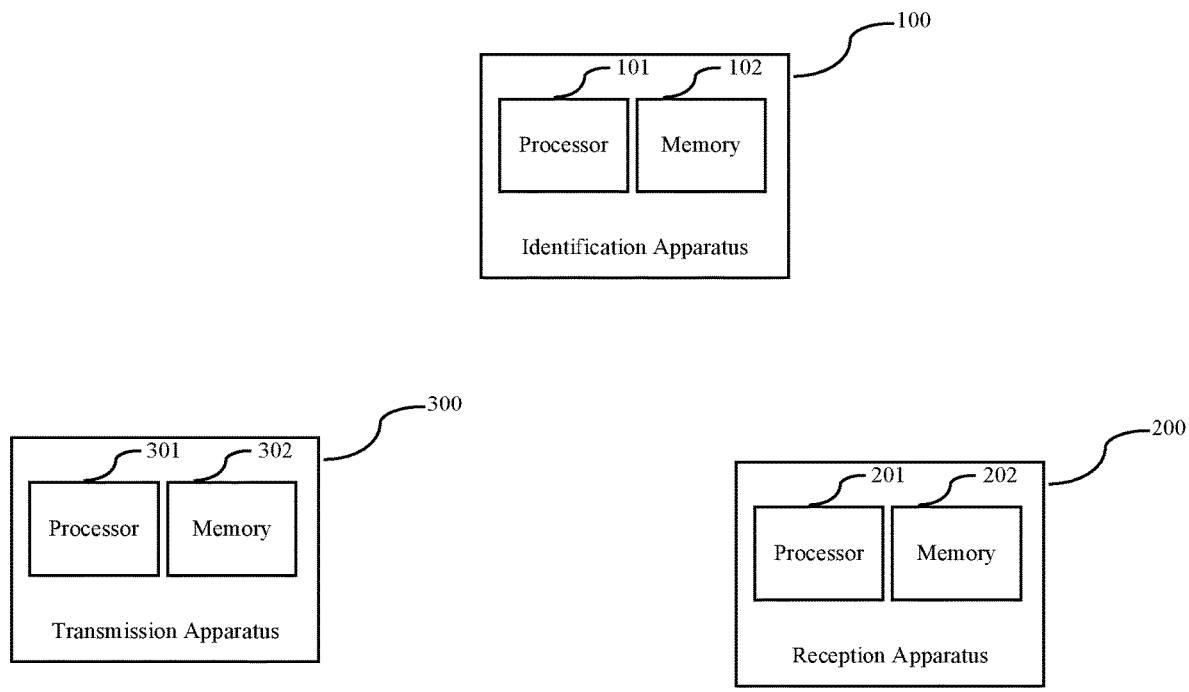
FIG. 27 is a block diagram showing exemplary apparatuses suitable for practicing the identification apparatus, reception apparatus, and transmission apparatus, according to embodiments of the disclosure.

FIG. 27 is a block diagram showing exemplary apparatuses suitable for practicing the identification apparatus, reception apparatus, and transmission apparatus, according to embodiments of the disclosure.

As shown in FIG. 27, the identification apparatus 100 may comprise a processor 101, and a memory 102. The memory may contain instructions executable by the processor. The identification apparatus may be operative to determine a reflection loss of a power of a wireless signal caused by a reflection at an object, for the purpose of identifying a material of the object and a location of the object.

In embodiments of the present disclosure, the identification apparatus may be further operative to perform the method according to any of embodiments above mentioned, such as shown in FIG. 2A-2C, FIG. 11-FIG. 15.

As shown in FIG. 27, the reception apparatus 200 may comprise a processor 201, and a memory 202. The memory may contain instructions executable by the processor. The reception apparatus may be operative to receive a wireless signal transmitted from a transmission apparatus and reflected by an object; and transmit, to an identification apparatus, information about the wireless signal.

In embodiments of the present disclosure, the reception apparatus may be further operative to perform the method according to any of embodiments above mentioned, such as shown in FIG. 3A-3B.

As shown in FIG. 27, the transmission apparatus 300 may comprise a processor 301, and a memory 302. The memory may contain instructions executable by the processor. The transmission apparatus may be operative to receive an indication for identifying a material of an object; and transmit a wireless signal reflected by the object to a reception apparatus.

In embodiments of the present disclosure, the transmission apparatus may be further operative to perform the method according to any of embodiments above mentioned, such as shown in FIG. 3C-3D.

The processors 101, 201, 301 may be any kind of processing component, such as one or more microprocessor or microcontrollers, as well as other digital hardware, which may include digital signal processors (DSPs), special-purpose digital logic, and the like. The memories 102, 202, 302 may be any kind of storage component, such as read-only memory (ROM), random-access memory, cache memory, flash memory devices, optical storage devices, etc.

Figure 28:
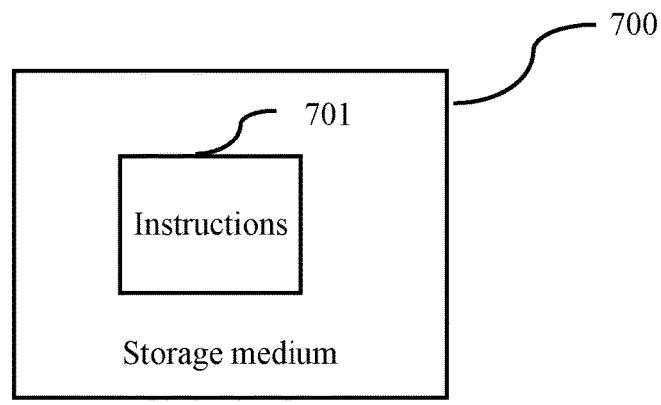
FIG. 28 is a block diagram showing an apparatus readable storage medium, according to embodiments of the present disclosure.

FIG. 28 is a block diagram showing an apparatus readable storage medium, according to embodiments of the present disclosure.

As shown in FIG. 28, the computer-readable storage medium 700, or any other kind of product, storing instructions 701 which when executed by at least one processor, cause the at least one processor to perform the method according to any one of the above embodiments, such as these shown in FIG. 2A-3D.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

Figure 29:
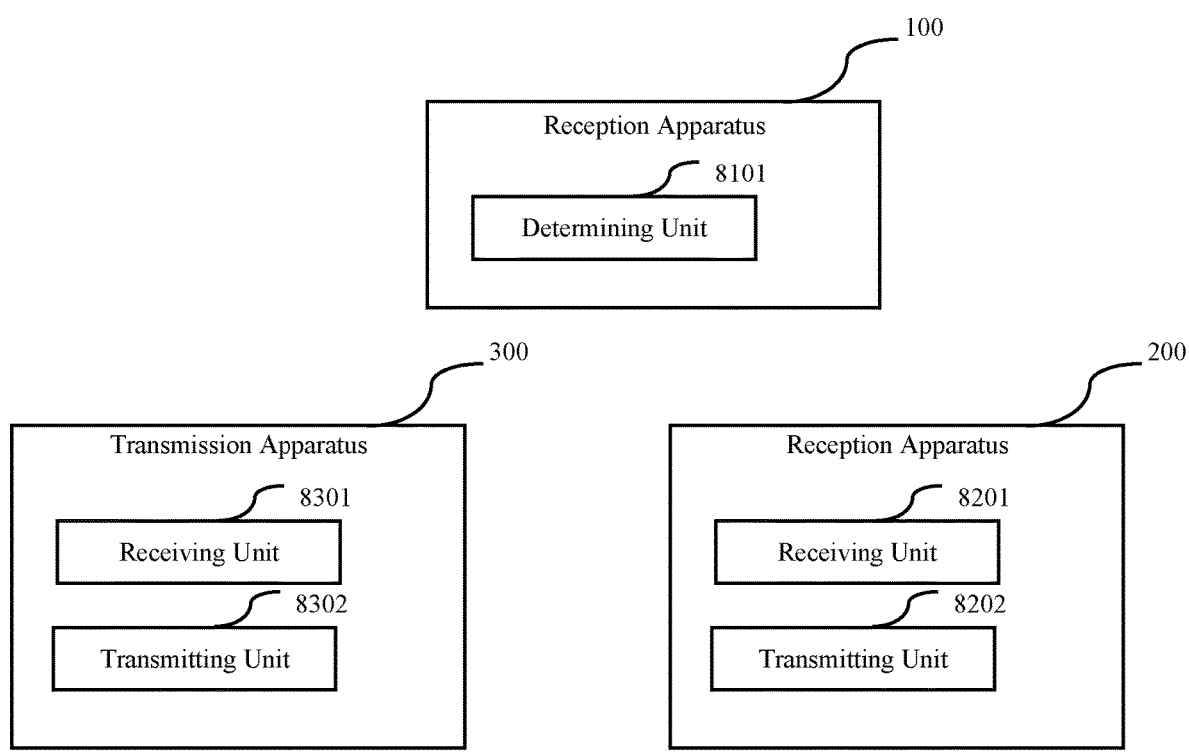
FIG. 29 is a schematic showing units for the identification reception apparatus, reception apparatus, and transmission apparatus, according to embodiments of the present disclosure.

FIG. 29 is a schematic showing units for the identification reception apparatus, reception apparatus, and transmission apparatus, according to embodiments of the present disclosure.

As shown in FIG. 29, the identification apparatus 100 may comprise a determining unit 8101, configured to determine a reflection loss of a power of a wireless signal caused by a reflection at an object, for the purpose of identifying a material of the object and a location of the object.

In embodiments of the present disclosure, the identification apparatus may be further operative to perform the method according to any of embodiments above mentioned, such as shown in FIG. 2A-2C, FIG. 11-FIG. 15.

As shown in FIG. 29, the reception apparatus 200 may comprise a receiving unit 8201, configured to receive a wireless signal transmitted from a transmission apparatus and reflected by an object; and a transmitting unit 8202, configured to transmit, to an identification apparatus, information about the wireless signal.

In embodiments of the present disclosure, the reception apparatus 200 may be further operative to perform the method according to any of embodiments above mentioned, such as shown in FIG. 3A-3B.

As shown in FIG. 29, the transmission apparatus 300 may comprise a receiving unit 8301, configured to receive an indication for identifying a material of an object; and a transmitting unit 8302, configured to transmit a wireless signal reflected by the object to a reception apparatus.

In embodiments of the present disclosure, the transmission apparatus may be further operative to perform the method according to any of embodiments above mentioned, such as shown in FIG. 3C-3D.

The term 'unit' may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the identification apparatus 100, the reception apparatus 200 and transmission apparatus 300 may not need a fixed processor or memory, any computing resource and storage resource may be arranged from at least one network node/device/entity/apparatus relating to the communication system. The virtualization technology and network computing technology (e.g. cloud computing) may be further introduced, so as to improve the usage efficiency of the network resources and the flexibility of the network.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Particularly, these function units may be implemented either as a network element on a dedicated hardware, as a software instance running on a dedicated hardware, or as a virtualized function instantiated on an appropriate platform, e.g. on a cloud infrastructure.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

Abbreviation Explanation 5G 5th Generation Wireless Systems
6G 6th Generation Wireless Systems
TX transmitter
RX receiver
LoS Line of sight
NLoS non-line of sight
PL path loss
FSPL free space path loss
RL reflection loss
VR virtual reality
RAT radio access technology
LTE long term evolution
SLAM simultaneous localization and mapping
RADAR radio detection and ranging
LIDAR laser radar
JCAS joint communication and sensing
RAT radio access technology
AOD angle of departure
AOA angle of arrival
TOF time of flight
RP reflection point
AD autonomous driving
TE transverse electric
TM transverse magnetic
RMM RSS measurement muting

The invention claimed is:

1. A method performed by an identification apparatus, the method comprising:
   determining a reflection loss of a power of a wireless signal caused by a reflection at an object, for the purpose of identifying a material of the object and localizing a position of the object, the object comprising a plurality of scatterers, and the reflection loss comprising an overall reflection loss of the wireless signal induced by the plurality of scatterers, based on a transmission power, a reception power, and a free space path loss of the wireless signal;
   calculating an overall path length of a trajectory of the wireless signal, based on time of flight measurement of the wireless signal;
   determining at least one candidate trajectory of the wireless signal between a transmitter and a receiver, based at least on the overall path length, determining the at least one candidate trajectory of the wireless signal between the transmitter and the receiver comprising:
      creating a plurality of trajectories, wherein each trajectory is created by connecting the transmitter, a first reflection point lying on a transmission line of the wireless signal, a second reflection point lying on a reception line of the wireless signal, and the receiver; and
      identifying at least one candidate trajectory, by matching the overall path length with each trajectory of the plurality of trajectories;
   determining at least one candidate material combination with corresponding incident angle of each reflection, based at least on the overall reflection loss; and determining locations and a material combination for the plurality of scatterers, based on a candidate trajectory and a candidate material combination.

2. The method according to claim 1, wherein determining the at least one candidate material combination comprises:
for a candidate trajectory of the at least one of candidate trajectory, applying in sequence each of a plurality of materials to the first reflection point, and the second reflection point;
for the candidate trajectory of the at least one of candidate trajectory, calculating a plurality of reflection loss values, wherein each reflection loss value is calculated per a combination of: a first material and a first incident angle at the first reflection point, and a second material and a second incident angle at the second reflection point; and
for the candidate trajectory of the at least one of candidate trajectory, identifying at least one candidate material combination, by matching the overall reflection loss with each of the plurality of reflection loss values;
wherein a material combination comprises a material at the first reflection point, and a material at the second reflection point.

3. The method according to claim 1, wherein determining the at least one candidate material combination comprises:
applying in sequence each of a plurality of materials to a first reflection point of a transmission line of the wireless signal, and to a second reflection point of a reception line of the wireless signal;
applying in sequence each of a plurality of first incident angle to the first reflection point, and in sequence each of a plurality of second incident angle to the second reflection point;
calculating a plurality of reflection loss values, wherein each reflection loss value is calculated per a combination of: a material and a corresponding first incident angle at the first reflection point, and a material and a corresponding second incident angle at the second reflection point; and
identifying at least one candidate material combination, by matching the overall reflection loss with each of the plurality of reflection loss values;
wherein a material combination comprises a material as well as a corresponding first incident angle at the first reflection point, and a material as well as a corresponding second incident angle at the second reflection point.

4. The method according to claim 3, wherein determining the at least one candidate trajectory of the wireless signal between the transmitter and the receiver comprises:
for a candidate material combination of the at least one candidate material combination, locating a corresponding first reflection point lying on the transmission line, wherein a corresponding first incident angle is satisfied at the corresponding first reflection point;
for the candidate material combination of the at least one candidate material combination, locating a corresponding second reflection point lying on the reception line, wherein a corresponding second incident angle is satisfied at the corresponding second reflection point;
for the candidate material combination of the at least one candidate material combination, creating a trajectory by connecting the transmitter, the corresponding first reflection point, the corresponding second reflection point, and the receiver; and
identifying at least one candidate trajectory, by matching the overall path length with each created trajectory.

5. The method according to claim 1, determining the locations and the material combination of the plurality of scatterers comprises:
determining that a location of a scatterer of the plurality of scatters is at the first reflection point and/or the second reflection point of a matched candidate trajectory corresponding to a matched candidate material combination; and
determining that each scatterer of the plurality of scatterers has a material of the matched candidate material combination corresponding to the matched candidate trajectory.

6. The method according to claim 1, further comprising: discretizing a transmission line of the wireless signal with a plurality of candidate points for the first reflection points; and discretizing a reception line of the wireless signal with a plurality of candidate points for the second reflection points.

7. The method according to claim 6, wherein distances between two adjacent candidate points are the same.

8. An identification apparatus comprising:
a processor; and
a memory, the memory containing instructions executable by the processor, whereby the identification apparatus is operative to:
determine a reflection loss of a power of a wireless signal caused by a reflection at an object, for the purpose of identifying a material of the object and localizing a position of the object, the object comprising a plurality of scatterers, and the reflection loss comprising an overall reflection loss of the wireless signal induced by the plurality of scatterers, based on a transmission power, a reception power, and a free space path loss of the wireless signal;
calculate an overall path length of a trajectory of the wireless signal, based on time of flight measurement of the wireless signal;
determine at least one candidate trajectory of the wireless signal between a transmitter and a receiver, based at least on the overall path length, determining the at least one candidate trajectory of the wireless signal between the transmitter and the receiver comprising:
creating a plurality of trajectories, wherein each trajectory is created by connecting the transmitter, a first reflection point lying on a transmission line of the wireless signal, a second reflection point lying on a reception line of the wireless signal, and the receiver; and
identifying at least one candidate trajectory, by matching the overall path length with each trajectory of the plurality of trajectories;
determine at least one candidate material combination with corresponding incident angle of each reflection, based at least on the overall reflection loss; and
determine locations and a material combination for the plurality of scatterers, based on a candidate trajectory and a candidate material combination.

9. A non-transitory computer-readable storage medium storing instructions which when executed by at least one processor of an apparatus, configure the processor to:
determine a reflection loss of a power of a wireless signal caused by a reflection at an object, for the purpose of identifying a material of the object and localizing a position of the object, the object comprising a plurality of scatterers, and the reflection loss comprising an overall reflection loss of the wireless signal induced by the plurality of scatterers, based on a transmission power, a reception power, and a free space path loss of the wireless signal;

calculate an overall path length of a trajectory of the wireless signal, based on time of flight measurement of the wireless signal;

determine at least one candidate trajectory of the wireless signal between a transmitter and a receiver, based at least on the overall path length, determining the at least one candidate trajectory of the wireless signal between the transmitter and the receiver comprising:

creating a plurality of trajectories, wherein each trajectory is created by connecting the transmitter, a first reflection point lying on a transmission line of the wireless signal, a second reflection point lying on a reception line of the wireless signal, and the receiver; and identifying at least one candidate trajectory, by matching the overall path length with each trajectory of the plurality of trajectories;

determine at least one candidate material combination with corresponding incident angle of each reflection, based at least on the overall reflection loss; and determine locations and a material combination for the plurality of scatterers, based on a candidate trajectory and a candidate material combination.

* * * * *